(12) United States Patent
Shiel

(10) Patent No.: US 9,869,486 B2
(45) Date of Patent: Jan. 16, 2018

(54) METHOD OF REDUCING HEATING ENERGY CONSUMPTION IN COMMERCIAL BUILDINGS

(71) Applicant: Patrick Andrew Shiel, Dublin (IE)

(72) Inventor: Patrick Andrew Shiel, Dublin (IE)

(*) Notice: Subject to any disclaimer, the term of this patent is extended or adjusted under 35 U.S.C. 154(b) by 0 days.

(21) Appl. No.: 15/179,798

(22) Filed: Jun. 10, 2016

(65) Prior Publication Data

US 2016/0334126 A1    Nov. 17, 2016

Related U.S. Application Data

(63) Continuation-in-part of application No. 14/607,011, filed on Jan. 27, 2015, now Pat. No. 9,395,712.

(51) Int. Cl.

| | |
|---|---|
| G05D 23/00 | (2006.01) |
| F24F 11/00 | (2006.01) |
| G05D 23/19 | (2006.01) |
| F24D 19/10 | (2006.01) |
| G05F 1/66 | (2006.01) |
| G06Q 10/04 | (2012.01) |
| G06Q 10/06 | (2012.01) |

(Continued)

(52) U.S. Cl.
CPC ........ *F24F 11/006* (2013.01); *F24D 19/1048* (2013.01); *F24D 19/1081* (2013.01); *G05D 23/1917* (2013.01); *G05F 1/66* (2013.01); *G06Q 10/00* (2013.01); *G06Q 10/04* (2013.01); *G06Q 10/06* (2013.01); *G06Q 50/06* (2013.01); *G06Q 50/16* (2013.01); *F24F 2011/0013* (2013.01); *F24F 2011/0047* (2013.01); *F24F 2011/0058* (2013.01); *F24F 2011/0075* (2013.01); *G06F 17/5004* (2013.01); *G06F 2217/16* (2013.01); *G06F 2217/80* (2013.01)

(58) Field of Classification Search
CPC ............... G06Q 10/04; H02J 2003/007; H02J 2003/003; G05B 2219/42001; Y02B 70/3225; Y02B 60/144; Y02B 70/3241
See application file for complete search history.

(56) References Cited

U.S. PATENT DOCUMENTS

| | | | |
|---|---|---|---|
| 7,451,017 B2* | 11/2008 | McNally | G06Q 50/06 700/275 |
| 8,014,880 B2* | 9/2011 | Samardzija | G05B 23/021 700/17 |

(Continued)

OTHER PUBLICATIONS

Kruger et al., Thermal monitoring and indoor temperature predictions in a passive solar building in an arid environment, Building and Environment 43 (2008) 1792-1804, 2007.*

(Continued)

*Primary Examiner* — Darrin Dunn

(57) ABSTRACT

This invention teaches a method of controlling the heating system of a commercial building, to reduce the thermal energy consumed by use of thermal parameters which are derived from readily-available data both internal and external to the building. By deriving a statistical relationship for each of the Solar Gain Rate and Day-time Natural Cooldown Rate from observed data, then based on the weather forecast, it is possible to determine if, when and for how long the mechanical heating system can be turned off or disabled from supplying heat to some of all of the building in question.

1 Claim, 19 Drawing Sheets

(51) Int. Cl.
   *G06Q 50/06*   (2012.01)
   *G06Q 50/16*   (2012.01)
   *G06Q 10/00*   (2012.01)
   *G06F 17/50*   (2006.01)

(56) References Cited

U.S. PATENT DOCUMENTS

| | | | |
|---|---|---|---|
| 8,977,405 B2 | 3/2015 | Shiel | |
| 2006/0009864 A1* | 1/2006 | Kranner | G05B 13/0265 700/28 |
| 2008/0082195 A1* | 4/2008 | Samardzija | G05B 23/021 700/109 |
| 2009/0287320 A1* | 11/2009 | MacGregor | G05B 17/02 700/29 |
| 2011/0231320 A1* | 9/2011 | Irving | G06Q 30/00 705/80 |
| 2011/0307109 A1* | 12/2011 | Sri-Jayantha | G06Q 10/04 700/291 |
| 2012/0095608 A1* | 4/2012 | Murakami | G06Q 10/04 700/291 |
| 2012/0323342 A1* | 12/2012 | MacArthur | G05B 17/02 700/29 |
| 2013/0245847 A1* | 9/2013 | Steven | G06Q 50/06 700/291 |
| 2013/0338839 A1* | 12/2013 | Rogers | G05D 23/1917 700/278 |
| 2014/0148963 A1* | 5/2014 | Ozog | G06Q 10/06 700/291 |
| 2014/0156085 A1* | 6/2014 | Modi | F24F 11/0012 700/276 |
| 2014/0202584 A1* | 7/2014 | Mathison | F17C 5/06 141/4 |
| 2015/0142368 A1 | 5/2015 | Shiel | |
| 2015/0198961 A1 | 7/2015 | Shiel | |
| 2015/0198962 A1 | 7/2015 | Shiel | |

OTHER PUBLICATIONS

Armstrong et al., Control with Building Mass- Part I: Thermal Response Model, CH-06-5-1, ASHRAE 2006.*

* cited by examiner

| B1 Building Usage | Total electrical Power (kWh) | Total Natural Gas Usage (kWh) |
|---|---|---|
| Jan | 207,353 | 367,798 |
| Feb | 244,004 | 417,166 |
| Mar | 281,787 | 331,608 |
| Apr | 291,566 | 305,652 |
| May | 247,185 | 195,190 |
| Jun | 272,702 | 142,498 |
| Jul | 310,670 | 180,722 |
| Aug | 273,205 | 155,407 |
| Sep | 268,210 | 189,024 |
| Oct | 284,603 | 238,256 |
| Nov | 293,774 | 330,486 |
| Dec | 294,697 | 389,378 |
| Total | 3,269,756 | 3,243,185 |

Fig. 5

| B1 kWhr/m²/yr | CIBSE typical | CIBSE Good Practice | B1 Baseline |
|---|---|---|---|
| Heat | 210 | 114 | 347 |
| Electricity | 358 | 234 | 350 |

Fig. 9

| B1 Building Solar and cool-down Thermal Parameters | Model | Dependant Variable | Units |
|---|---|---|---|
| Natural thermal lag profile (NTLP) | NTL = 12.93 − 0.555Tout ± 1.9 | Daily average external temperature | 15 min periods |
| Solar Gain Rate (SGR) | SGR = 69.3 + 0.231Tout ± 0.14 | Daily average external temperature | °F/hour |
| Day-time natural cool-down rate (DNCR) | DNCR = 72.69 − 0.274ALaggedTout ± 0.26 | Daily average lagged external temperature | °F/hour |

Fig. 10

| Pilot Building P1 kWhr/m²/yr | CIBSE typical | CIBSE Good Practice | benchmark year | Year 1 | Year 2 | Year 3 |
|---|---|---|---|---|---|---|
| Heat | 210 | 114 | 347 | 159 | 88 | 109 |
| Electricity | 358 | 234 | 350 | 301 | 241 | 211 |

Fig. 13

| Building B1 | Pre-Efficiency Program | Post-Efficiency Program |
|---|---|---|
| Month | Total Electricity Usage (BM) | Total Electricity Usage |
| Jan | 207,353 | 176,047 |
| Feb | 244,004 | 162,647 |
| Mar | 281,787 | 162,764 |
| Apr | 291,566 | 163,730 |
| May | 247,185 | 164,220 |
| Jun | 272,702 | 150,155 |
| Jul | 310,670 | 177,270 |
| Aug | 273,205 | 162,086 |
| Sep | 268,210 | 160,435 |
| Oct | 284,603 | 170,557 |
| Nov | 293,774 | 168,027 |
| Dec | 294,697 | 160,111 |
| TOTAL | 3,269,756 | 1,978,048 |

Fig. 14

METHOD OF REDUCING HEATING ENERGY CONSUMPTION IN COMMERCIAL BUILDINGS

RELATED APPLICATIONS

This application is a continuation in part of U.S. application Ser. No. 14/607,011 by the same inventor, entitled Building energy usage reduction of automation of optimized plant operation times and sub-hourly building energy forecasting to determine plant faults, filed Jan. 27, 2015, publication number US 2015-0198962 A1. The entirety of application Ser. No. 14/607,011 is incorporated by reference as if fully set forth herein.

This application is also related to U.S. application Ser. No. 13/906,822, entitled Continuous Optimization Energy Reduction Process in Commercial Buildings, filed May 31, 2013, publication number 2013-0304269 A1; and where the entirety of Ser. No. 13/906,822 is incorporated by reference as if fully set forth herein.

This application is also related to U.S. application Ser. No. 14/606,989, entitled Method for determining the unique natural thermal lag (NTL) of a building, filed Jan. 27, 2015, publication number 2015-0198961 A1; and where the entirety of Ser. No. 14/606,989 is incorporated by reference as if fully set forth herein.

This application is also related to U.S. application Ser. No. 14/966,300, entitled Development of certain mechanical heat profiles and their use in an automated optimization method to reduce energy consumption in commercial buildings during the heating season, filed Dec. 11, 2015, and where the entirety of Ser. No. 14/966,300 is incorporated by reference as if fully set forth herein.

This application is also related to U.S. application Ser. No. 15/066,681, entitled Development of certain mechanical cooling profiles and their use in an automated optimization method to reduce energy consumption in commercial buildings during the cooling season, filed Mar. 10, 2016, and where the entirety of Ser. No. 15/066,681 is incorporated by reference as if fully set forth herein.

GOVERNMENT FUNDING

None

FIELD OF USE

The invention is useful in energy management, and more particularly in the field of energy management in commercial buildings.

BACKGROUND

Energy use analysis in commercial buildings has been performed for many years by a number of software simulation tools which seek to predict the comfort levels of buildings while estimating the energy use. The underlying principles of these tools concentrate on thermal properties of individual elements of the building itself, such as wall panels, windows, etc. The complexity and level of detail required to accurately simulate a commercial building often makes its' use prohibitive. The accuracy of such models has also been called into question in the research material. Following the construction and occupation of a new commercial building, the installed plant, such as boilers and air conditioning equipment, whose function is to provide suitable occupant comfort, is usually controlled by a building management system (BMS).

Through practical experience within the construction industry, it has become known that this plant is often over-sized and the use of the plant is often excessive. Common examples of this include plant operating for significantly longer than required including unoccupied weekends, heating and cooling simultaneously operating in the same areas due to construction or control strategy problems and issues with overheating and the use of cooling to compensate.

Where the common problem of overheating occurs, the building envelope is quite efficient in dumping excess heat by radiation. In a similar manner, where buildings are over-cooled in summer, buildings are very effective in absorbing heat from the external environment to compensate. The utilization of this plant is not normally matched to the building envelope in which it operates and it is the intention to show how the method described in this document can help with this matching process.

Publication number 2013-0304269 A1 and publication number 2015-0198961 A1 teach a series of methods developed to provide a high-level view of thermal performance in a commercial building. This view is quick to implement and easily understood by facilities and maintenance staff. The methods facilitate a better understanding of the thermal performance of a building envelope, as constructed, and the interaction between this envelope and the building's heating and cooling plant, as installed. The thermal performance of the building envelope and how it interacts with the plant has been expressed as a series of time lags and profiles which are functions of external temperature and solar activity. External temperature remains the most influential of the external weather parameters on energy usage. The lags and profiles have been developed to be derived from data which is readily available within modern conventional buildings.

BRIEF SUMMARY OF THE INVENTION

Consistent with publication number 2013-0304269 A1, where the derivation of a building's natural thermal lag and the solar gain lag were presented, and publication number 2015-0198961 A1 where a less data intensive method to calculate the natural thermal lag was presented, the following is an explanation of how the natural thermal lag can be used to guide the derivation of a series of thermal profiles which can be combined to achieve automated optimization of thermal energy usage in commercial buildings during the heating season. More specifically, to identify and quantify the opportunities for lowering or eliminating heating during the building's occupied hours.

In this specification, two important thermal parameters are taught: the first which describes the rate at which solar activity affects the internal space temperature of a building (Solar Gain Rate) and the second which shows how quickly the building cools down when mechanical heat is disabled during occupied hours (Day-Time Natural Cool-down Rate).

Solar Gain Rate

The solar activity parameter is referred to as Solar Gain Rate (SGR) and it represents, over the course of one day, a statistical relationship describing how a series of internal space temperatures vary with accumulating Total Global Radiation on a 15-minute interval basis. A series of global radiation values are generated by summing the radiation as measured at 15-min intervals so that, at each successive 15-min point, the previous global radiation sum is added to that which accumulated over the latest 15-min period, starting the accumulation at sunrise and finishing when the internal temperature stops rising. The measurements are taken during a day when no mechanical heat or cooling is present and the building has very low occupancy. This choice of solar data and the regression method make it possible to examine buildings in high and low solar activity areas.

There is a Solar Gain Rate Profile for each day and as more data is gathered for each of these days, a Solar Gain Response Surface can be generated which can be used to determine how the building will respond at certain times of day, given the external temperature and solar conditions prevalent at that time. The end goal is to develop a series of linear statistical relationships between internal space temperature and the on-going accumulation of global radiation where each relationship is bound to a particular average external temperature (as measured from the time the heating goes off the previous night to the time the heating goes off during the current day.

Even if the building is glazed on all four sides, not all spaces will be affected equally by solar activity. The particular period of time which is of interest in this specification is that which occurs during the hours of occupation. There is interest in (a) avoiding space overheating due to solar gain in winter and (b) using solar gain, where possible to contribute to heating of the building. Clearly, the ability to contribute to heating in winter will very much depend on the building's geographical location.

Solar activity is frequently recorded by measuring the Total Global Radiation with a light meter. Total Global Radiation is a measure of the total direct and diffused radiation in the visible and near infra-red spectrum. Given the well accepted close relationship between the level of solar activity over a full year and the external temperature, it is possible to establish a statistical relationship between the SGR and external temperature in real time, i.e. no lag applied. With this statistical relationship, for a particular level and duration of sunshine in the weather forecast for any given time of year, this allows the forecasting of the likely contribution of this solar gain to the internal temperatures in any building, uniquely. It is possible and desirable to measure the solar gain effects in several parts of any building, in all four compass directions.

Day-Time Natural Cool-Down Rate

The day-time natural cool-down rate (DNCR) is a measure of how quickly the average space temperature in a suitable number of open spaces in a building naturally falls after mechanical heating has been disabled. It is the rate at which this cool-down happens naturally and has been shown to depend on the average daily lagged external temperature. The slope is measured from the time the mechanical heating stops to the time the space temperature has fallen by 1° F. This rate is dependent on the solar activity and the external temperature for any given day. Therefore, for any given building, it is possible to determine this rate in two parts, one for days where solar activity is high and one where there is minimal solar activity, i.e. cloudy. With weather forecast information about external temperature and solar activity, the amount of time that the heating system can be disabled for short periods, during occupied hours, can be determined.

The DNCR is determined firstly while the building is unoccupied, perhaps at the weekend. Occupancy will usually introduce more thermal inputs (occupants and lighting, office equipment, computers, etc.) and therefore calculating the DNCR during unoccupied periods, can be deemed the worst case in determination of possible off periods for the heating system.

This invention teaches a method of controlling the heating system of a commercial building, to reduce the thermal energy consumed by use of thermal parameters which are derived from readily-available data both internal and external to the building. By deriving a statistical relationship for each of the Solar Gain Rate and Day-time Natural Cooldown Rate from observed data, then based on the weather forecast, it is possible to determine if, when and for how long the mechanical heating system can be turned off or disabled from supplying heat to some of all of the building in question.

BRIEF DESCRIPTION OF DRAWINGS

The drawings listed are provided as an aid to understanding the invention.

Figure 4A:
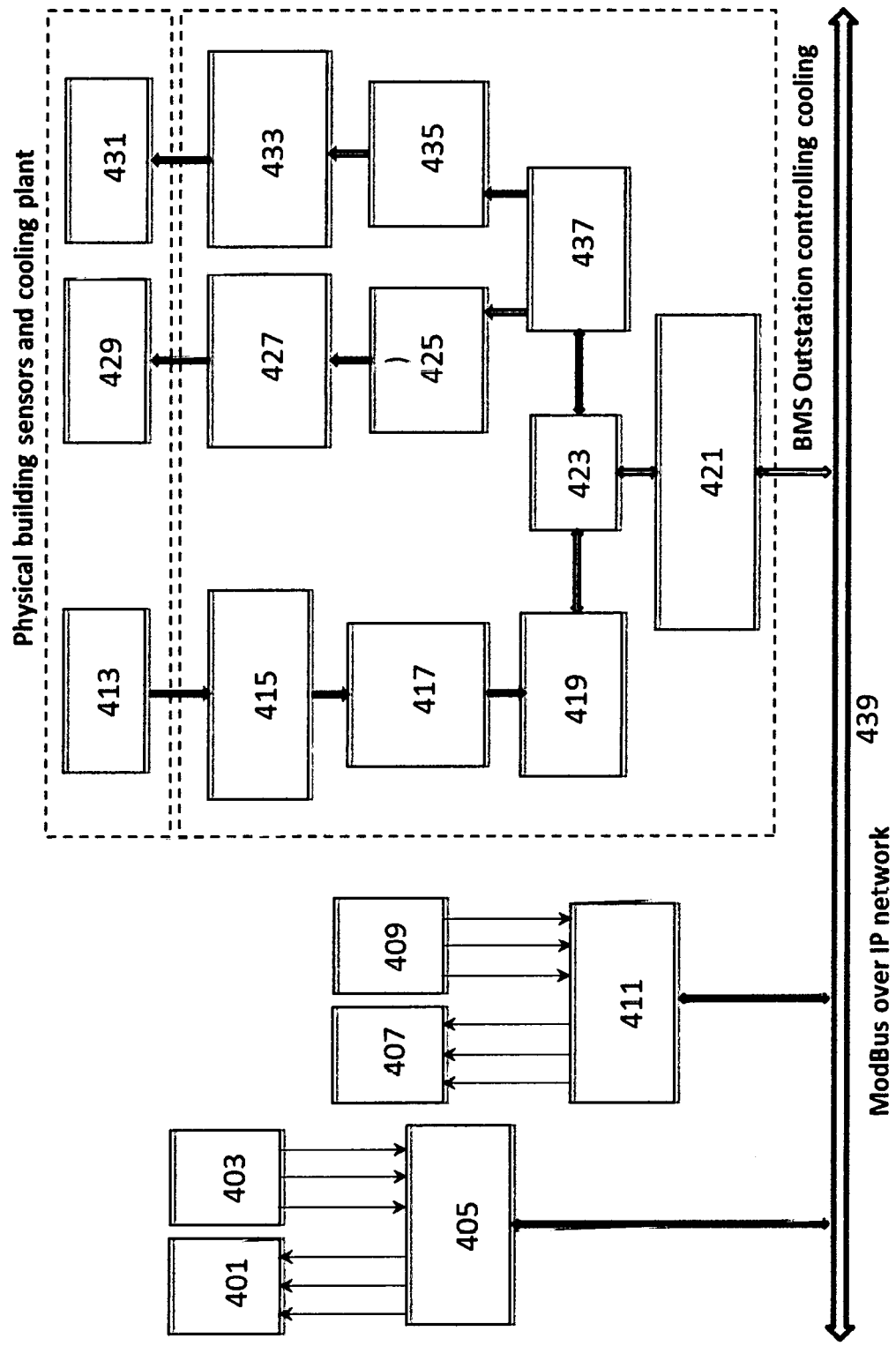
Figure 4B:
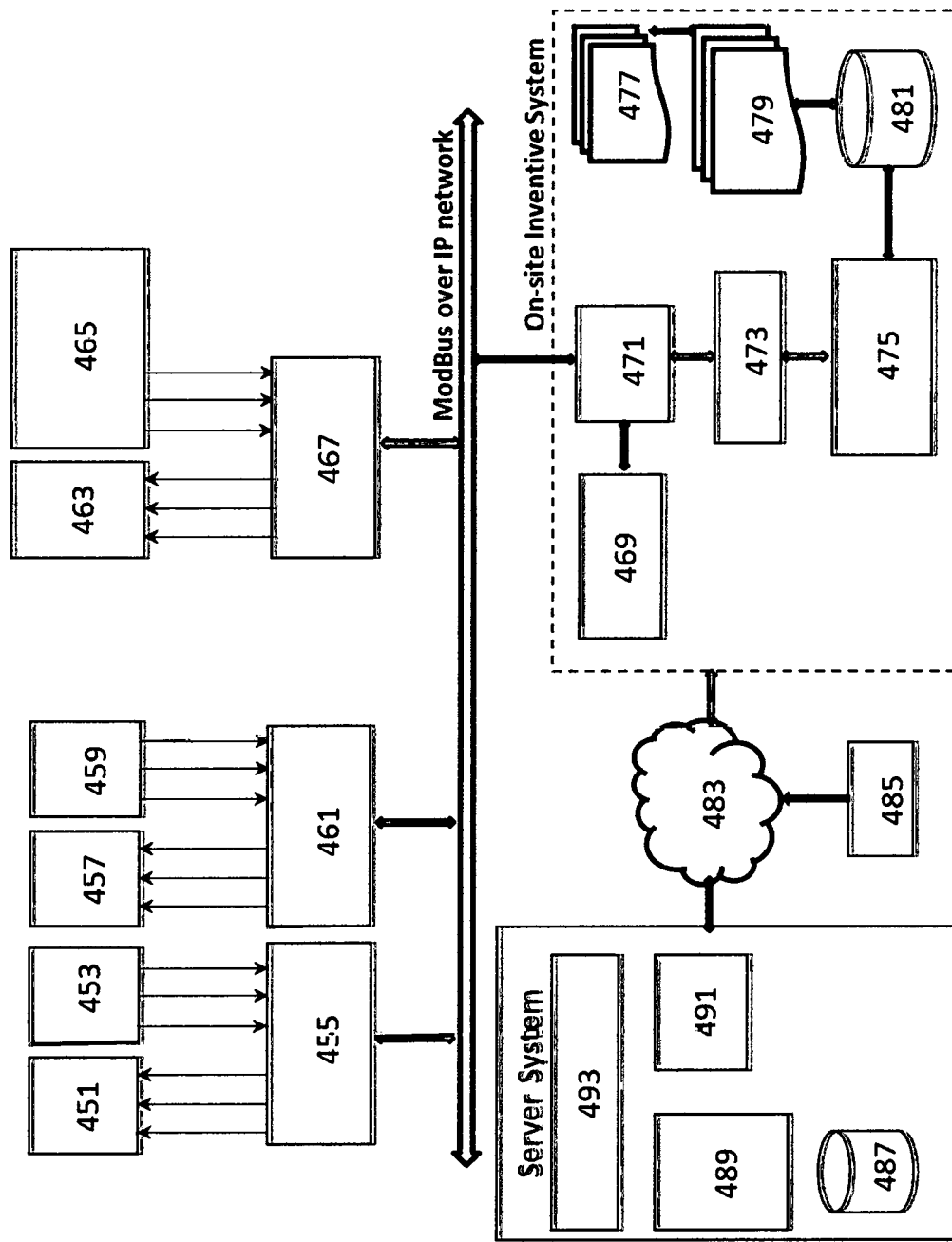
Figure 6:
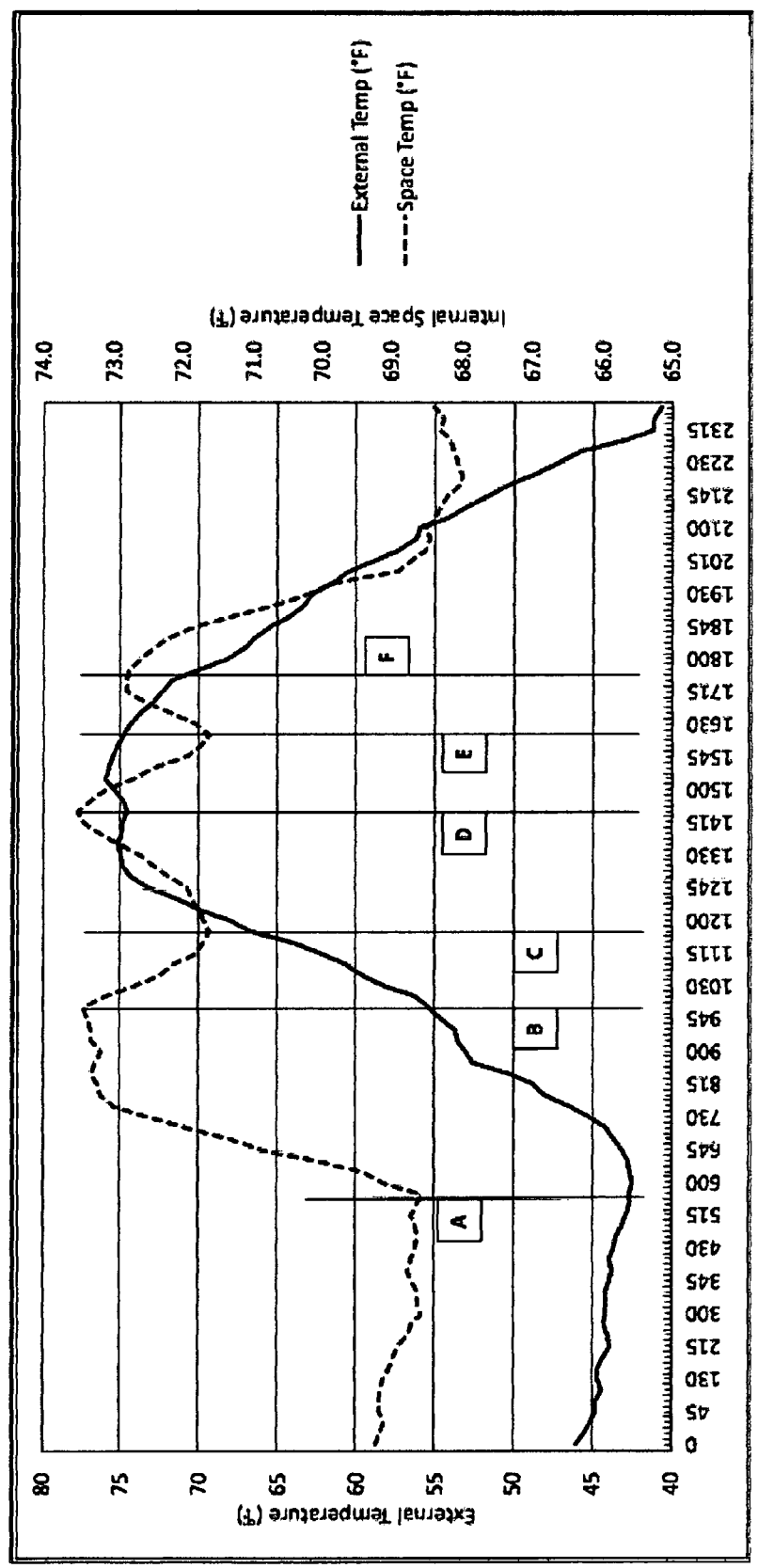

FIGS. 4, 4A and 4B inclusive, wherein 4A Physical connections from building management system to plant and Modbus over IP FIG. 4B Inventive system connecting to the BMS Modbus over IP network FIG. 5 building B1 agreed energy baseline data FIG. 6 Building space temperature profile with mechanical heating, normal occupancy, high solar activity and use of chilling to compensate for solar gain/overheating. A:Heat ON; B:Chilling ON; C:Chilling OFF; D:Chilling ON; E:Chilling OFF; F:Heat OFF FIG. 7 Building space temperature profile with mechanical heating, normal occupancy, low solar activity and use of heating control to regulate space temperature. A:Heat ON; B:Heat OFF; C:Heat ON; D:Heat OFF; E:Heat ON, F; Heat OFF FIG. 8 Building space temperature profile with mechanical heating, normal occupancy, high solar activity and use of optimized heating control to regulate space temperature, with no chilling. A:Heat ON; B:Heat OFF FIG. 9 building B1 benchmark (BM) usage versus CIBSE usage ranges for heat and electricity FIG. 10 building B1 thermal profile statistical models derived from on-site and observed data FIG. 11 Total heat delivered to building B1—over a four year period with the commencement of the energy efficiency program indicated FIG. 12 Total chilling delivered to building B1—over a four year period with the commencement of the energy efficiency program indicated FIG. 13 Annual energy use outcomes for P1 over the four year period FIG. 14 Comparison of electricity and gas equivalent usage over calendar baseline year versus year 3

DETAILED DESCRIPTION OF A PREFERRED EMBODIMENT OF THE INVENTION

Introduction

The invention is a method which can be implemented on a computing device capable of connecting directly to a commercial building management system. The inventive method provides improved control of plant operations to enable significant energy savings in commercial buildings while providing desirable occupant comfort levels.

This section describes the introduction of two new thermal profiles, the manner in which these profiles along with the natural thermal lag described in publication number 2013-0304269 A1 and publication number 2015-0198961 A1 can be applied to the control of plant in a particular building, and finally, the application of these concepts to an actual building and the energy reduction results. The two new building specific thermal profiles are referred to as the Solar Gain Rate (SGR) and the Day-time Natural Cooldown Rate (DNCR).

Following publication number 2013-0304269 A1, where the derivation of a building's natural thermal lag was presented, and publication number 2015-0198961 A1 where a less data intensive method to calculate the natural thermal lag was presented, the following is an explanation of how the natural thermal lag, along with a number of important thermal profiles, can be combined to achieve automated optimization of energy usage in commercial buildings. The following sections recap on how the natural thermal lag is derived in publication number 2013-0304269 A1 and publication number 2015-0198961 A1.

Natural Thermal Lag

The derivation of the building-unique natural thermal lag can be summarized as follows (from publication number 2013-0304269 A1 and publication number 2015-0198961 A1):

The natural thermal lag (NTL) of a commercial building is a unique property which indicates how quickly the internal spaces of the building respond to changes in external temperature. The NTL can be derived as follows:

a) using previously recorded data within said commercial building being 12 months of internal and external temperature data recorded at 15-minute intervals while the building was at rest, or in other words, the building was not in use, had no plant operating and experienced less than 1 hour of solar activity during the day in question (publication number 2013-0304269 A1). If internal temperature data is not available, the data used are energy consumption and external temperature data recorded at 15-minute intervals (publication number 2015-0198961 A1)

b) deriving the natural thermal lag (NTL) of said commercial building by applying the sum of squares method on the 12 months of internal and external temperature data only on days when the building was at rest, where each value of NTL is calculated according to:

$$LagIndex_{LW} = \sum_{i=2p}^{p} (T_{S_i} - T_{O_{i-LW}})^2$$

wherein $LagIndex_{LW}$ is a sum of squares particular to a range of external temperatures indicated by a value LW, p is a number of 15 minute observations examined, $T_{S_i}$ is an internal space temperature at time period i, $T_{O_{i-LW}}$ is an outside temperature at LW periods prior to time period i If internal temperature is not available, apply the building energy to external temperature data regression analysis method as follows:

$$E_i = \beta_0 + \beta_1 (LT_i)_{k=0 \ldots 8} + \epsilon_i$$

where $E_i$ represents average hourly energy usage for said building on day i, $\beta_0$ represents a Y axis intercept of a linear relationship between energy and lagged temperature average, $\beta_1$ represents a slope of a relationship between average hourly energy usage and a lagged temperature average $(LT_i)_{k=0 \ldots 8}$ for a day i and ranging over a period k from 0 to 8 hours prior to a building closing time, $\epsilon$ is estimated variation.

The particular index of lagged average external temperature during the winter yields the low point of NTL sinusoid, while the particular index of lagged average external temperature during the summer yields the high point of the NTL sinusoid. This yields an approximated NTL plot over the full year (publication number 2015-0198961 A1).

c) Each NTL point (one for each day the building is at rest) can be plotted against the average external temperature recorded for that day. The relationship between the NTL and average daily external temperature can be established according to the regression equation:

$$NTL_i = \beta_0 - \beta_1 Tout_i + \epsilon_i$$

wherein $NTL_i$ is the natural thermal lag calculated on a particular day i $\beta_0$ is the intercept of the linear relationship between NTL and the average daily external temperature Tout on the y-axis $\beta_1$ is the slope of the linear relationship between NTL and the average daily external temperature Tout $Tout_i$ is the average daily external temperature calculated as the average of the 96 external temperature readings recorded during day i $\epsilon_i$ is the variability in the linear relationship.

Once the particular relationship between NTL and daily average external temperature is established for said commercial building, the NTL can be estimated for any given average daily external temperature.

Natural Thermal Lag Profile

Figure 1:
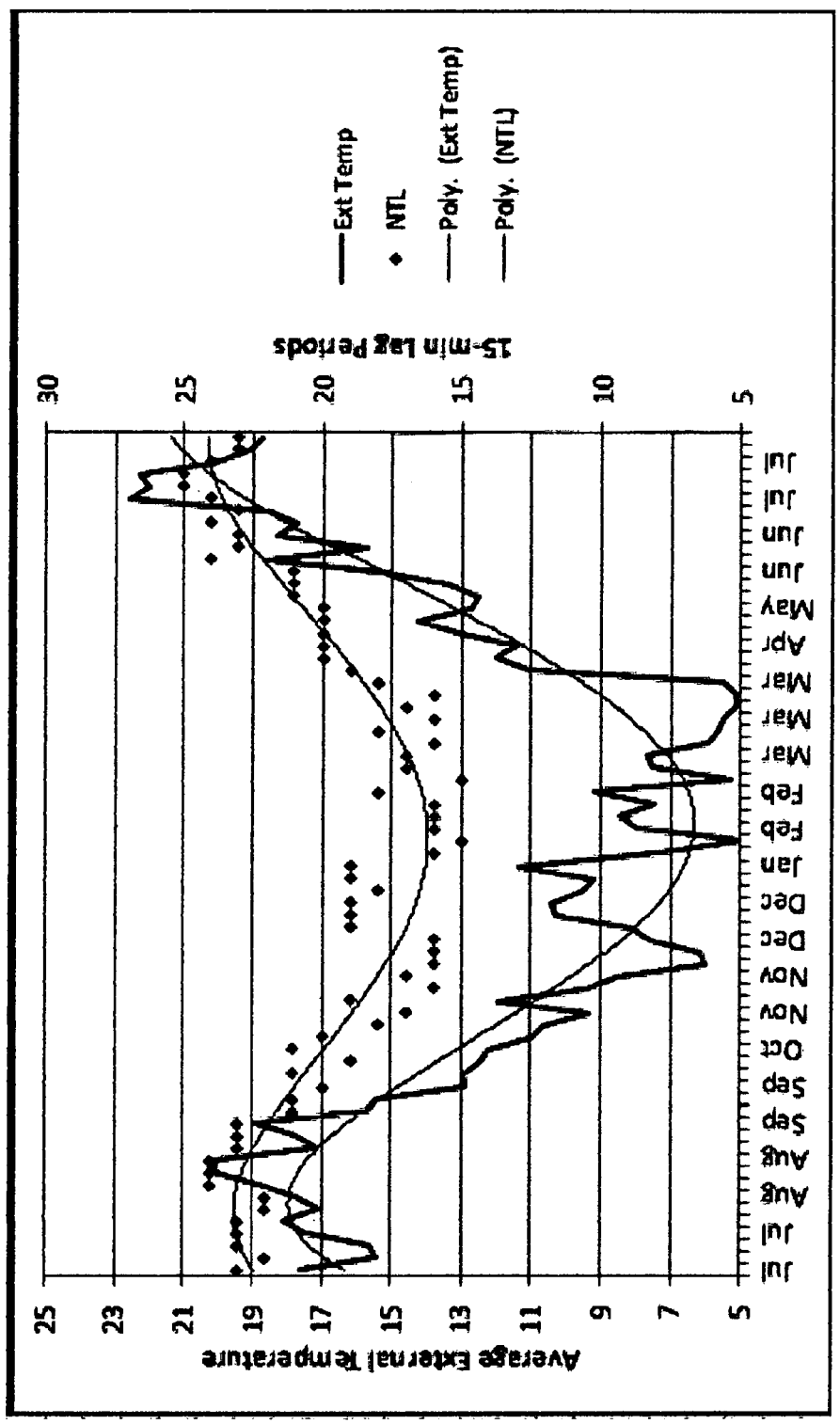
FIG. 1 Plot of test building B1 natural thermal lag as a function of external temperature. External temperature is shown for reference FIG. 2A Building space temperature profile with no mechanical heating, no occupancy and very low solar activity (all-day cloud cover). The distance between A and B, and between C and D represents the Natural Thermal Lag for this building (about 1.25 hrs). The slope of the line between B and D represents the Daytime natural heat-up profile FIG. 2B Building space temperature profile with no mechanical heating, no occupancy and high solar activity (all-day sunshine). The slope of the line between E and F represents the combination of Daytime Natural Heat-up Profile and the Solar Gain Rate for this particular external temperature profile FIG. 3, 3A though 3D inclusive, illustrate steps of a method according to the invention, wherein FIG. 3A Steps 500-550.

Plotting the individual values of the natural thermal lag derived from data for each day the building is at-rest is indicated in FIG. 1. From FIG. 1, it is evident that the NTL is strongly related to the average daily external temperature.

The strength of that relationship for this building can be examined by linear regression in which daily average outside temperature $Tout_i$ can be regressed against the observed NTL (based on results in pub. no. 2013-0304269 A1).

This relationship can be statistically modelled as a simple linear regression of:

$$NTL_i = \beta_0 - \beta_1 Tout_i + \epsilon_i$$

The actual model derived for the test building B1 is:

$$NTL = 12.93 - 0.555 Tout \pm 1.9$$

The parametric statistics which define this relationship are shown as an extract from the Minitab statistical analysis package:

Regression Analysis: B1 NTL versus Average Tout

The regression equation is
NTL = 12.93 + 0.5546 Average Tout
S = 0.851145  R-Sq = 91.7%  R-Sq(adj) = 91.6%

Analysis of Variance

| Source | DF | SS | MS | F | P |
|---|---|---|---|---|---|
| Regression | 1 | 539.462 | 539.462 | 744.65 | 0.000 |
| Error | 67 | 48.538 | 0.724 | | |
| Total | 68 | 588.000 | | | |

This particular NTL response curve in FIG. 1 is defined by the high and low points. The curve remains consistently sinusoidal in following the pattern of average external temperatures from year to year. Therefore, it follows that if the high and low points are known, the annual NTL response curve can be estimated.

In publication number 2015-0198961 A1, it has been shown how energy usage data of winter heating and summer cooling can be used to determine the optimum value of NTL for these seasons without any reference to internal temperature data.

In fact, these values of NTL for summer and winter represent the highest and lowest points of the sinusoid and therefore a method to determine the year-long NTL response for this building has been developed, based on energy usage and external temperature data alone.

This facilitates the simple estimation of the building's unique NTL to be used for energy efficiency purposes, in the event that rapid estimation is required or that a full year of internal space temperature data is unavailable.

The solar gain rate and the day-time natural cool-down rate are now defined. They are useful in determining the possible off periods for a building's heating system based on the external temperature profile contained in a weather forecast. This section shows how these two thermal parameters can be applied and are therefore used to reduce thermal energy consumption in commercial buildings.

Solar Gain Rate

The solar activity parameter is referred to as Solar Gain Rate (SGR) and it represents, over the course of one day, a statistical relationship describing how a series of internal space temperatures vary with the accumulating global radiation on a 15-minute interval basis. A series of total global radiation values are generated by summing the radiation as measured at 15-min intervals so that, at each successive 15-min point, the previous total global radiation sum is added to that which accumulated over the latest 15-min period, starting the accumulation at sunrise and finishing when the internal temperature stops rising. The measurements are taken during a day when no mechanical heat or cooling is present and the building has very low occupancy. This choice of solar data and the regression method make it possible to examine buildings in high and low solar activity areas.

Figure 2A:
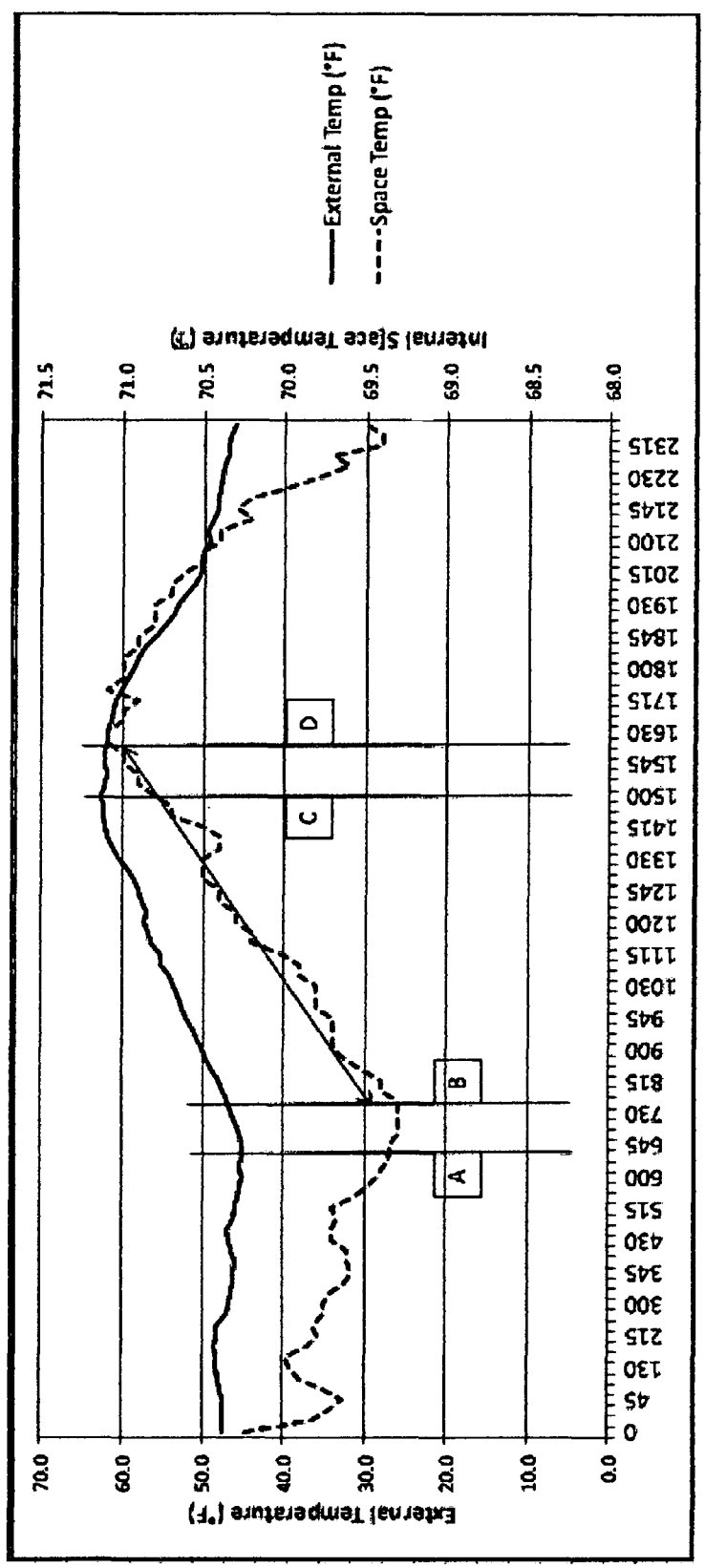
Figure 2B:
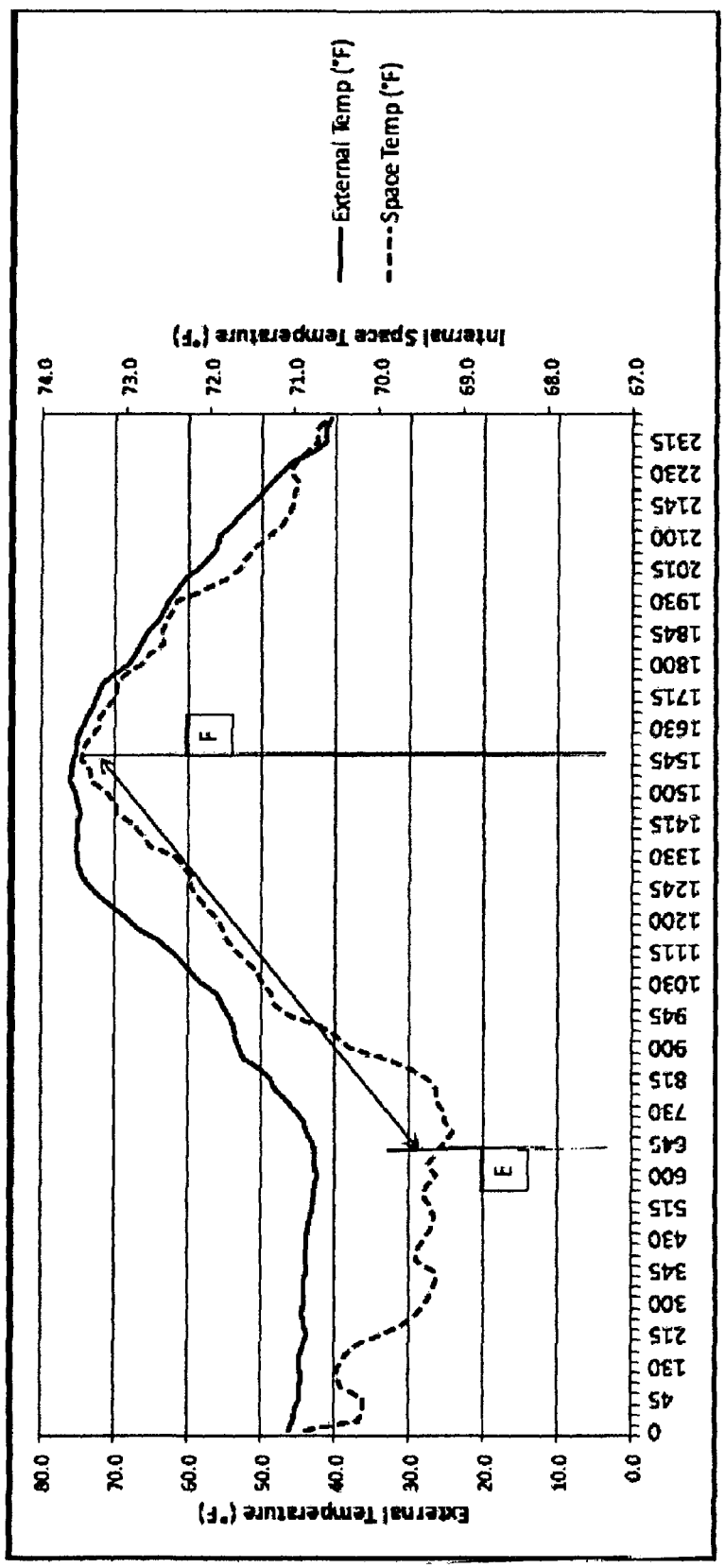
Figure 3A:
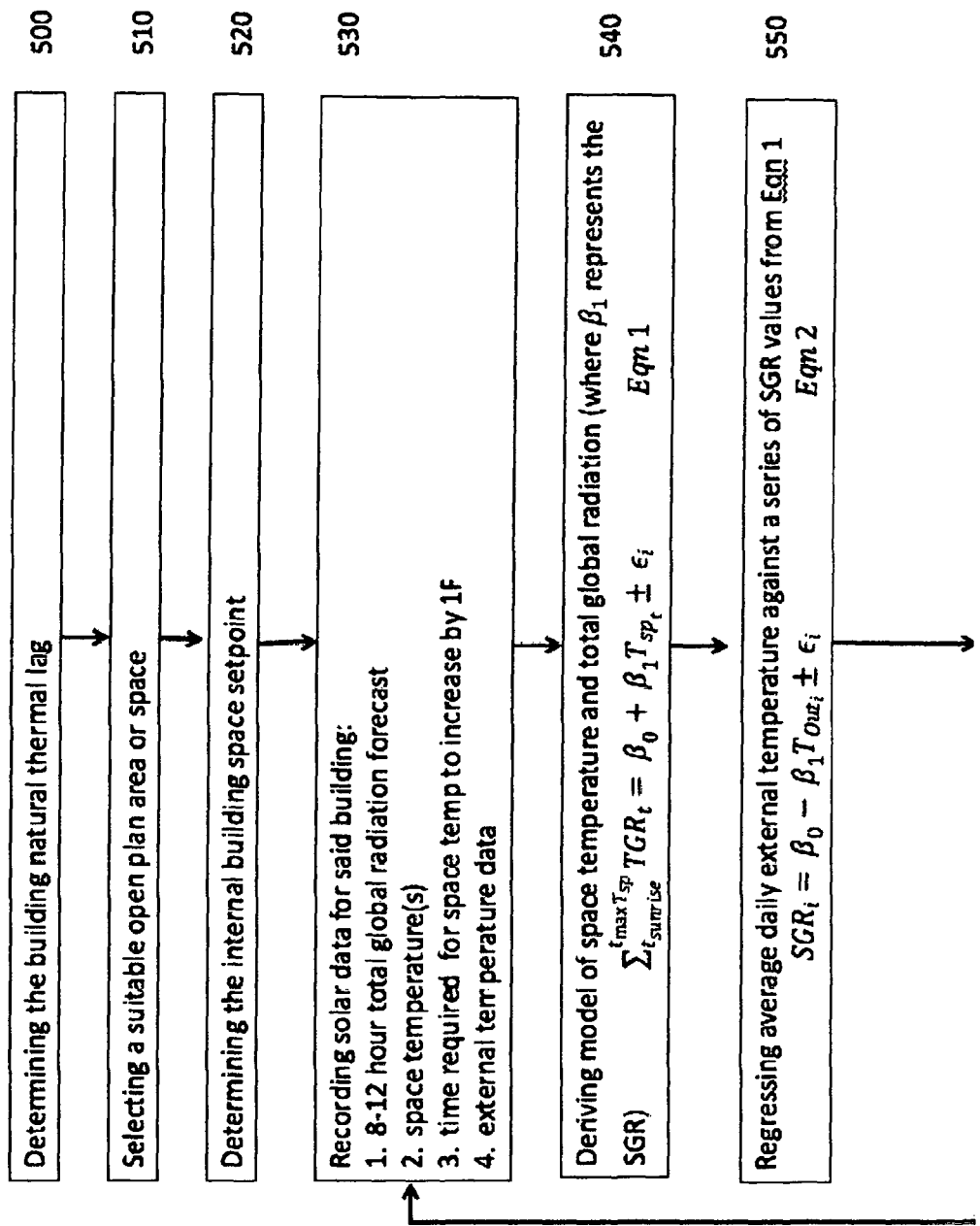
FIG. 3B Steps 560-610.
FIG. 3C Steps 620-700.
FIG. 3D Steps 710-770 deleted
Figure 3B:
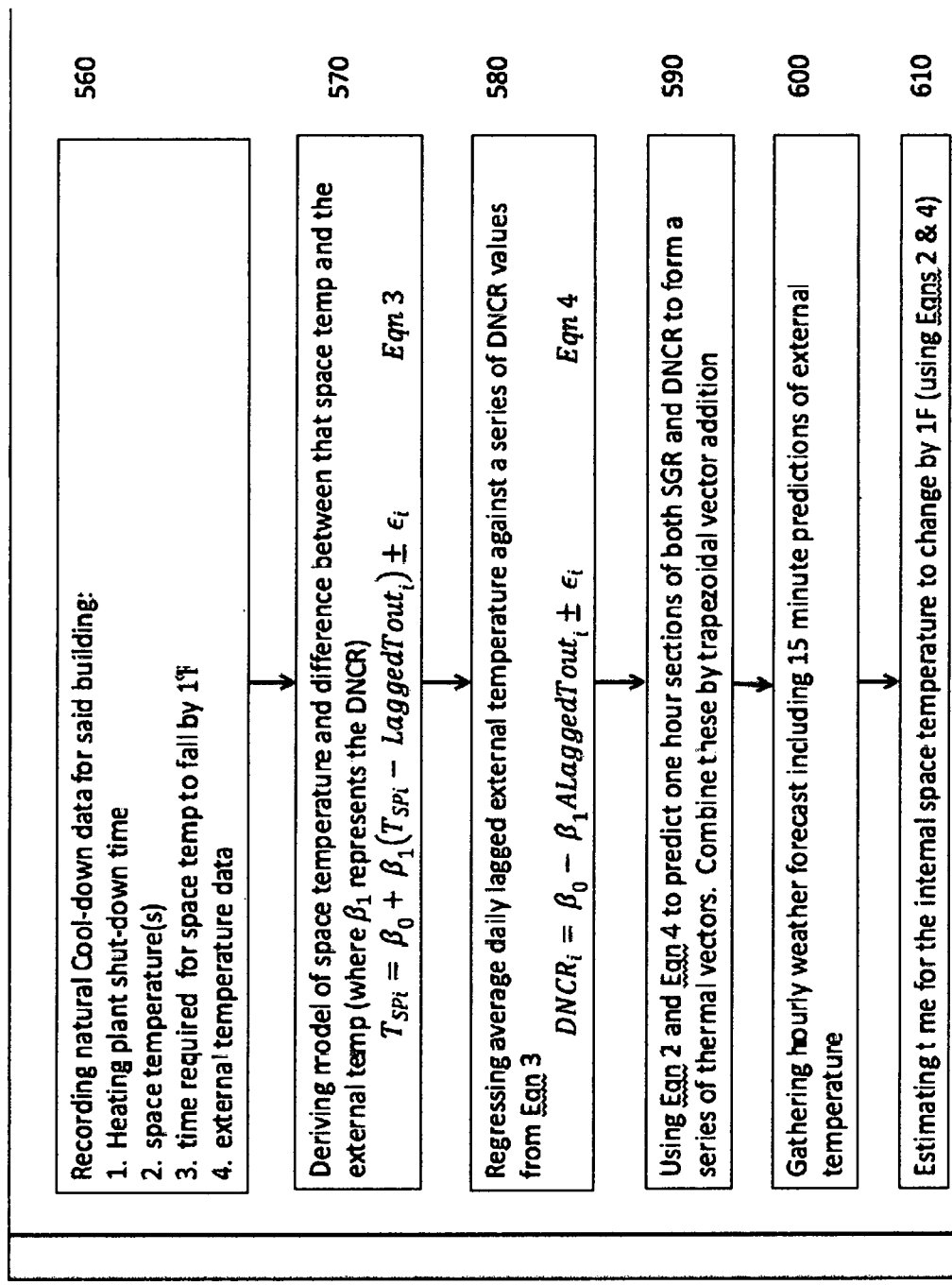
Figure 3C:
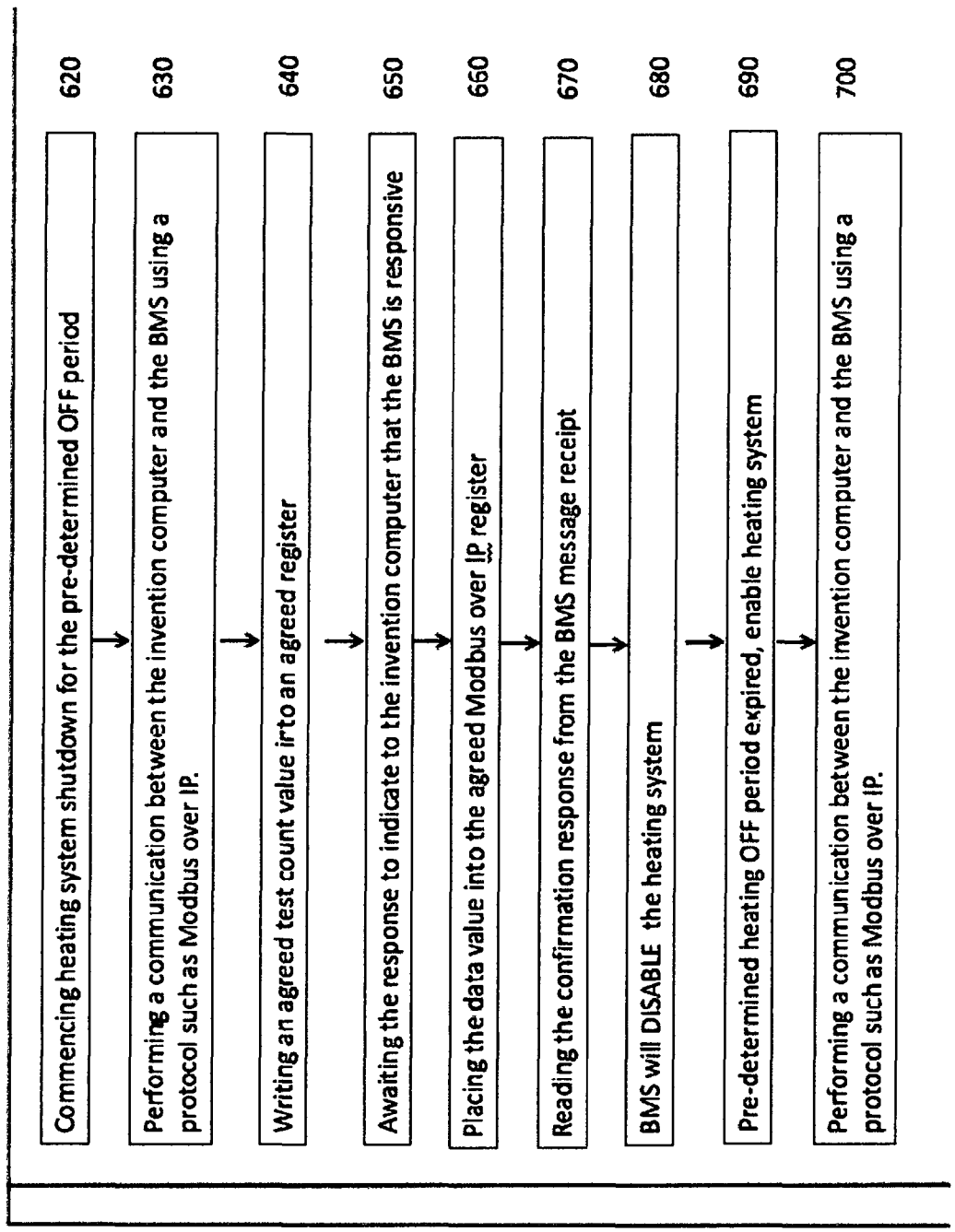
Figure 3D:
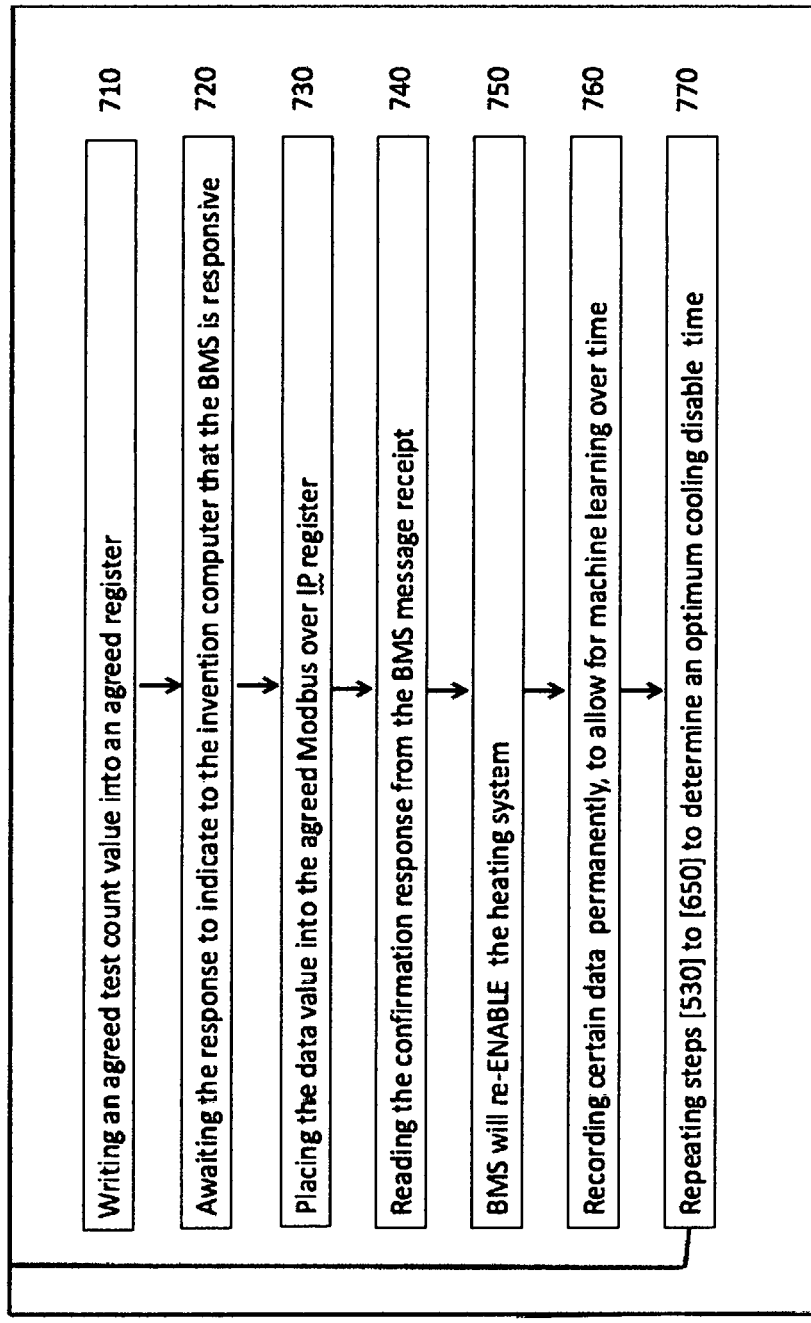

There is one of these profiles for each day and one for each chosen area of the building in question. As more data is gathered for each of these days, a Solar Gain Response Surface can be generated which can be used to determine how the building will respond at certain times of day, given the external temperature and solar conditions prevalent at that time. The end goal is to develop a series of linear statistical relationships between internal space temperature and the on-going accumulation of global radiation where each relationship is bound to a particular average external temperature (as measured from sunrise to the time when the internal space reaches its' peak temperature, usually mid-afternoon). FIG. 2A shows the internal space temperature profile on a day when the building was unoccupied, no mechanical plant running and low solar activity. Compare this to FIG. 2B, same building conditions but high solar activity. The internal space temperature is higher on the day of high solar activity. Data shows that this building is influenced by solar activity.

Even if the building is glazed on all four sides, not all spaces will be affected equally by solar activity. For this reason, there may be different Solar Gain Rates and profiles for different parts of any given building.

Solar activity forecasts are commonplace and are usually available in the form of Total Global Radiation. Two scenarios are examined: (a) while mechanical heating is off and there is low occupancy and (b) while mechanical heating is on and there is normal occupancy. Both scenarios are examined to determine the regression relationship between both, for any given average external temperature. This facilitates the examination of solar gain effects on buildings while they are not occupied. Over a full heating season, it is possible to determine the Solar Gain Rate profile for a given average external temperature (as measured between sunrise and when the internal temperature reaches its peak value).

During the heating season, mechanical heating is used to get the space temperature in the given building to the desired level (the set-point). Once there or slightly above, the heating can be shut off by disabling the boilers, or more commonly, by turning off the heating supply pumps. It is of interest to determine how quickly the space temperature falls in a building, after this shutdown, as a function of external temperature both when solar activity is high and low. It is of particular interest to determine how the temperature of the building varies with winter solar activity in or around the usually acceptable internal space temperature set point of 72° F.

A linear relationship is formed between the accumulating Total Global Radiation and the internal space temperature as follows:

$$\sum_{t_{sunrise}}^{t_{maxT_{sp}}} TGR_t = \beta_0 + \beta_1 T_{sp_t} \pm \epsilon_i \qquad \text{Eqn 1}$$

wherein $$\sum_{t_{sunrise}}^{t_{maxT_{sp}}} TGR_t$$

is the accumulating value of Total Global Radiation as measured and accumulated on a 15 minute basis, over a time period from sunrise ($t_{sunrise}$) to when the internal space temperature reaches its' peak value ($t_{maxT_{sp}}$)

$\beta_0$ represents the intercept of the linear relationship between the accumulating Total Global Radiation and internal space temperature, on the y-axis $\beta_1$ represents the slope of the linear relationship between the accumulating Total Global Radiation and internal space temperature $T_{sp_t}$ represents the value of internal space temperature as measured at time t $\epsilon$ represents the variability in the linear model.

The slope of this relationship $\beta_1$ which is formed for each day represents the Solar Gain Rate for that particular day. By recording the average external temperature from sunrise to the point at which the maximum internal temperature occurred, a statistical relationship can be formed which closely relates the SGR with this average external temperature index.

This relationship takes the general form of:

$$SGR_i = \beta_0 - \beta_1 T_{Out_i} \pm \epsilon_i \qquad \text{Eqn 2}$$

wherein $SGR_i$ is the slope of the relationship in Eqn 1 derived for each day i under examination $\beta_0$ represents the intercept of the linear relationship between the Solar Gain Rate and the averaged external temperature from sunrise to the maximum value of the internal space temperature, on the y-axis $\beta_1$ represents the slope of the linear relationship between the accumulating Solar Gain Rate and the average external temperature $T_{Out_i}$ represents the averaged external temperature as measured from sunrise to the time of maximum internal space temperature on day i $\epsilon$ represents the variability in the linear model.

It is important that the two steps defined as Eqn 1 and Eqn 2 are performed separately. This is because on certain days, the average external temperature (Eqn 2) may not strongly correlate with accumulated Total Global Radiation (Eqn 1). This might happen during particularly windy days where the external temperature near the building remains low because of the wind, while the solar radiation is being captured by the glazing in the building and is shielded from the wind effects by an efficient façade.

Day-Time Natural Cool-Down Rate

The day-time natural cool-down rate (DNCR) is a measure of how quickly the average space temperature in a suitable number of open spaces in a building naturally falls after mechanical heating has been disabled. It is the rate at which this cool-down happens naturally and has been shown to depend on the average daily lagged external temperature. The slope is measured from the time the mechanical heating stops to the time the space temperature has fallen by 1° F. This rate is dependent on the solar activity and the external temperature for any given day. Therefore, for any given building, it is possible to determine this rate in two parts, one for days where solar activity is high and one where there is minimal solar activity, i.e. cloudy. With weather forecast information about external temperature and solar activity, the amount of time that the heating system can be disabled for short periods, during occupied hours, can be determined.

The DNCR is derived by first finding the relationship between the space temperature and the difference between this space temperature and the lagged external temperature over the period required to observe a 1° F. fall in space temperature when the mechanical heating is switched off.

A regression model is derived to show how the internal space temperature changes as a function of the difference between that space temperature and the lagged external temperature for each heating day by using an equation:

$$T_{SPi} = \beta_0 + \beta_1(T_{SPi} - \text{Lagged}T\text{out}_i) + \epsilon_i \qquad \text{Eqn 3}$$

wherein $T_{SPi}$ is the internal space temperature recorded at time period i $\beta_0$ represents the intercept of the linear relationship between the internal space temperature and the difference between the internal space temperature and the external lagged temperature, as guided by the NTL, on the y-axis $\beta_1$ represents the slope of the relationship between the internal space temperature $T_{SPi}$ and the difference between that temperature and the external lagged temperature $\text{Lagged}T\text{out}_i$ at time period i $\text{Lagged}T\text{out}_i$ is the value of lagged external temperature, as guided by the natural thermal lag, observed for any given time period i $\epsilon$ represents the variability in the linear model.

The slope of this linear relationship $\beta_1$ is the DNCR for this particular daytime period. By deriving several values of DNCR, one for each day, and recording the average daily lagged external temperature for the same day, a predictive relationship can be formed which indicates how the DNCR will vary as a function of daily average lagged external temperature. This yields a series of $DNCR_{p=1\ldots N}$ values for heating days 1 . . . N. This is shown in generalized form as follows:

$$DNCR_i = \beta_0 - \beta_1 A\text{Lagged}T\text{out}_i \pm \epsilon_i \qquad \text{Eqn 4}$$

wherein $DNCR_i$ is the derived day-time natural cool-down rate on any given day i, on which the heating system is operating $\beta_0$ represents the intercept of the linear relationship between DNCR and daily average lagged external temperature as guided by the natural thermal lag on the y-axis $\beta_1$ represents the slope of the relationship between $DNCR_i$ and daily lagged average external temperature $A\text{Lagged}T\text{out}_i$ $A\text{Lagged}T\text{out}_i$ represents the value of daily average lagged external temperature guided by the natural thermal lag calculated for any given day i $\epsilon$ represents the variability in the linear model Combining SGR and DNCR Because the methods used to separately derive both Solar Gain Rate (Eqn 2) and the Daytime Natural Cool-down Rate (Eqn 4) depend on data which can be independently observed, the resulting thermal performance equations can be easily combined to determine what will actually happen if mechanical heating is turned off in a building (or section of a building) and the effect solar activity will have on this. During the heating season, the cooling effect of turning off the heating when the internal space temperature is 72° F. or higher, coupled with the heating effect of solar activity and occupancy when the internal space temperature is 72° F. or higher can be combined in a simple manner by simply adding the thermal effects of both Eqn 2 and Eqn 4. It is possible to break the thermal responses into one hour sections commencing at the time of first occupation, say 7-8 am. This process will yield a series of vectors which represent an hourly rate of internal temperature change. The corresponding vectors for each hour can be combined by using the universally accepted methods of trapezoidal or triangular vector combination. The final forms of Eqn 2 and Eqn 4 are dictated by actual building data, and as such, are fully representative of what will actually happen in the building.

Inventive Method

According to the invention, method steps are outlined in FIG. 3A to FIG. 3D and are explained in the following section.

Method to determine suitable off periods for [heating system of commercial building]/space heating/during times of occupancy a) Determining [500] the building natural thermal lag by the means shown—these have been shown in the preceding sections. Two methods exist and which one is used is determined by the data available. The methods to derive the natural thermal lag are more fully explained in U.S. Pat. No. 8,977,405 and in U.S. Pat. No. 9,317,026.

b) Selecting [510] a suitable open plan area or space within a selected commercial building or a series of suitable open spaces in which to observe the space temperature(s);

c) Determining [520] the internal building space set-point for the current heating season. This is usually set at approximately 72° F. This is simply read off the building management system computer screen;

d) Recording [530] solar data for the selected building during periods of solar activity, non-operating mechanical plant and low to zero occupancy by recording the following data:
  1. actual total global radiation
  2. space temperature(s) for the chosen open plan location(s) at sunrise
  3. time required for the chosen open-plan location(s) space temperature(s) to rise by 1° F.
  4. external temperature data in 15 minute intervals
  5. Record these internal and external temperatures until the internal space temperature stops rising e) Deriving [540], using this recorded data, a regression model to show how the internal space temperature(s) change(s) as a function of Total Global Radiation for each heating day using the generalized equation:

$$\sum_{t_{sunrise}}^{t_{maxTsp}} TGR_t = \beta_0 + \beta_1 T_{sp_t} \pm \epsilon_i \qquad \text{Eqn 1}$$

wherein $\sum_{t_{sunrise}}^{t_{maxTsp}} TGR_t$ is the accumulating value of Total Global Radiation as recorded and accumulated on a 15 minute basis, over a time period from sunrise ($t_{sunrise}$) to when the internal space temperature reaches its peak value ($t_{max\, T_{sp}}$)

$\beta_0$ represents a y-axis intercept of the linear relationship between the accumulating Total Global Radiation and internal space temperature $\beta_1$ represents a slope of a linear relationship between the accumulating Total Global Radiation and internal space temperature $T_{sp_t}$ represents a value of internal space temperature as measured at time t $\epsilon$ represents the variability in the linear model.

f) Determining [550] the Solar Gain Rate (SGR) of spaces within this building by relating the slope of the linear relationship in Eqn 1 to the average external temperature recorded from sunrise to when the internal space temperature reaches its' maximum point. Repeat the process outlined in d) and e), recording each average daily external temperature from sunrise to the time of maximum space temperature and the slope of the regression relationship pertaining to that particular day, $\beta_1$ or SGR. In this regression model (Eqn 1), the slope $\beta_1$ will be referred to as the SGR.

This yields a series of $SGR_{i=1\ldots N}$ values for heating days 1 . . . N. A relationship can be established which links the SGR to the average daily average external temperature.

This relationship takes the general form of:

$$SGR_i = \beta_0 - \beta_1 T_{Out_i} \pm \epsilon_i \qquad \text{Eqn 2}$$

wherein $SGR_1$ is the slope of the relationship in Eqn 1 derived for each day i under examination $\beta_0$ represents the intercept of the linear relationship between the Solar Gain Rate and the averaged external temperature from sunrise to the maximum value of the internal space temperature, on the y-axis $\beta_1$ represents the slope of the linear relationship between the accumulating Solar Gain Rate and the average external temperature $T_{Out_i}$ represents the averaged external temperature as measured from sunrise to the time of maximum internal space temperature on day i $\epsilon$ represents the variability in the linear model.

g) Recording [560] data from the building management system computer screens and physically verified during the day-time natural cool-down phase during the day for the selected building by recording the following data:
  1. heating system shut-down time
  2. space temperature(s) for the chosen open plan location(s) at this shut-down time
  3. time required for the chosen open-plan space temperature to fall by 1° F.
  4. external temperature data in 15 minute intervals h) Deriving [570], using this recorded data, a regression model to show how the internal space temperature changes as a function of the difference between that space temperature and the lagged external temperature for each heating day using an equation:

$$T_{SPi} = \beta_0 + \beta_1 (T_{SPi} - \text{Lagged}T\text{out}_i) \pm \epsilon_i \qquad \text{Eqn 3}$$

wherein $T_{SPi}$ is the internal space temperature recorded at time period i $\beta_0$ represents the intercept of the linear relationship between the internal space temperature and the difference between the internal space temperature and the external lagged temperature, as guided by the NTL, on the y-axis $\beta_1$ represents the slope of the relationship between the internal space temperature $T_{SPi}$ and the difference between that temperature and the external lagged temperature LaggedTout$_i$ at time period i LaggedTout$_i$ is the value of lagged external temperature, as guided by the natural thermal lag, observed for any given time period i ϵ represents the variability in the linear model i) Determining [580] the day-time natural cool-down rate (DNCR) on days the heating system is operating, to help estimate the amount of time the heating function—i.e. the heating system—is not required during the periods of occupancy of the building as a function of average lagged external temperature, repeat the process outlined in g) and h), recording each average daily lagged external temperature and the slope of the regression relationship pertaining to that particular day, β$_1$ or DNCR. In this regression model (Eqn 3), the slope β$_1$ will be referred to as the DNCR.

This yields a series of DNCR$_{i=1...N}$ values for heating days 1 ... N. A relationship can be established which links the DNCR to the average daily average lagged external temperature and this is shown in generalized form in Eqn 4:

$$DNCR_i = \beta_0 - \beta_1 ALaggedTout_i \pm \epsilon_i \qquad \text{Eqn 4}$$

wherein

DNCR$_i$ is the derived day-time natural cool-down rate on any given day i, on which the heating system is operating β$_0$ represents the intercept of the linear relationship between DNCR and daily average lagged external temperature as guided by the natural thermal lag on the y-axis β$_1$ represents the slope of the relationship between DNCR$_i$ and daily lagged average external temperature ALaggedTout$_i$ ALaggedTout$_i$ represents the value of daily average lagged external temperature guided by the natural thermal lag calculated for any given day i ϵ represents the variability in the linear model j) Using [590] the relationships formed in Eqn 2 and Eqn 4, take the predicted rise and fall of internal space temperature(s) in one hour sections starting at the time of first occupation. Apply either the trapezoidal or triangular method of vector combination to yield a prediction of how the building space temperatures will respond due to the heating system being OFF combined with solar activity k) Gathering [600] the hourly weather forecast to include 15 minute predictions of external temperature for the following 8-12 hours, ensuring the forecast extends beyond the estimated winter natural thermal lag of the commercial building in question for the time of year under examination l) Using [610] Eqn 2 and Eqn 4 in conjunction with the forecast of total global radiation and external temperatures, estimating the effects on the internal space temperature, particularly to predict the time required for the internal space temperature to rise or fall 1° F. either side of the agreed set-point, or some other agreed and acceptable level of space temperature. This level of allowable fluctuation in internal space temperature must be agreed and is therefore variable, but for the purpose of this specification, it is assumed to be 1° F.

m) Commencing [620] heating system shutdown n) Performing [630] a communication between the invention computer and the BMS using a protocol such as Modbus over IP to disable the heating system. For example if the hex value of 0x0101 represents 'Heating system DISABLE' if placed in Modbus register 8006, as agreed with the BMS programmer o) Writing [640] an agreed test count value into an agreed register to ensure the BMS knows the invention computer is present and functional p) Awaiting [650] the response from the BMS, to indicate to the invention computer that the BMS is responsive q) Placing [660] the 0x0101 data value into the agreed Modbus over IP protocol register at the calculated heating off time r) Reading [670] the confirmation response from the BMS in another register to confirm to the invention computer that the instruction to disable the heating system has been received s) Responding [680] to this writing of digital data (0x1010) into this register (8006), the BMS will turn the heating system off t) Depending [690] on the results of the vector combination explained in step 590, it has been determined that the heating system may be disabled for some period. Following the disabling of the heating system, space temperature will fall. The effects of solar gain, even during winter may cause a rise in space temperature. These combined effects are examined and if the resultant vector falls within agreed space temperature limits, as explained in 610, the heating system will remain off for this period. Following the expiration of this calculated period, the heating system is enabled by performing the following steps:

u) Performing [700] a communication between the invention computer and the BMS using a protocol such as Modbus over IP. This communication will usually happen at the heating system on time. For example if the hex value of 0x1010 represents 'Heating system ENABLE' if placed in Modbus register 8006, as agreed with the BMS programmer v) Writing [710] an agreed test count value into an agreed register to ensure the BMS knows the invention computer is present and functional w) Awaiting [720] the response from the BMS, to indicate to the invention computer that the BMS is responsive x) Placing [730] the 0x1010 data value into the agreed Modbus over IP protocol register at the appropriate healing on time y) Reading [740] the confirmation response from the BMS in another register to confirm to the invention computer that the instruction to enable the heating system has been received z) Responding [750] to this writing of digital data (0x1010) into this register (8006), the BMS will bring on the heating system aa) Recording [760] permanently, the observed 15-minute interval data for weather forecast, internal space temperatures and all other relevant data used in the above equations to facilitate more accuracy in the data regression models, to effectively allow for machine learning over time;

bb) Repeating [770] steps d) 530 to aa) 760 at an appropriate time, as calculated, to determine an optimum heating disable/re-enable time period during the heating season.

Practical Use of the Method in Real Buildings

The method has been developed for practical implementation in real buildings. The majority of modern commercial buildings, be they office, retail, medical, educational, etc. are equipped with a building management system (BMS). The BMS is a computerized system which monitors vital parameters inside and outside the building and depending on the particular building-specific control strategy, the BMS will respond by switching plant on/off or if the plant has variable control, increasing/decreasing the level of output. Because of the need for high levels of reliability, availability and serviceability, most BMS are highly distributed in nature, meaning that one section of the BMS is completely independent of the others. This removes the risk of single points of failure in the overall system.

The BMS hardware architecture therefore consists of control points (referred to as out-stations) which are autonomous but network connected. Each of these out-stations might monitor such things as several space temperatures and control multiple heating and cooling devices, in response to these monitored readings. The overall collection or framework of out-stations, monitors and controls go to make up the BMS. There are many manufacturers of these systems throughout the World; the largest might include companies such as Siemens (GR), Honeywell (US), Johnson Controls (US) or Trend (UK).

The most common form of communications within the BMS framework is a low level protocol called ModBus. This protocol was developed within the process control industry (chemical plants, oil refineries, etc.) and it dates from the earliest forms of computer control. The implementation concept of ModBus is that of addressable registers which are either readable, writable, or both. The easiest way to imagine the implementation is that of pigeon-holes. So with this protocol, it is possible to use a computer device, equipped with a ModBus hardware interface, to request the reading of a register (say register 8002) which might represent some space temperature (value can vary between 0000 and FFFF (in Hexadecimal) which, let's say, represents a temperature range of 0° F. to +200° F.). On reading this space temperature, the algorithm in the connected computer can now determine the response, so if the reading is 0x5EB8 (representing 74° F.), the computer might request that the heating valve be lowered and this is done by writing a new value to another register, say register 8006. The BMS will interpret this value and act accordingly. This assumes, of course, that the BMS is set up or programmed to monitor these registers and act accordingly. This protocol must be agreed with the BMS programmer in advance so that both sides of the ModBus registers are aware of the meaning and mapping of register addresses and values.

Physical Connections

In the practical implementation of this system, the physical connection to the BMS is normally achieved over an industry-standard Internet Protocol (IP) network. This is the same type of network installed in a standard office or commercial building. Much development has been done by the BMS manufacturers in recent years to get the BMS protocols, such as ModBus, to function over a standard Ethernet or IP network. This has led to ModBus over IP. If a new computer, such as the invention computer, is introduced to this Modbus over IP network, the new computer is simply assigned an IP address by the network administrator and thereafter, that computer can issue read and write commands over IP, once the map of registers is known to the new computer. As mentioned, this map is known to the BMS programmer, so the introduction of the new computer would preferably happen with the knowledge and agreement of the BMS programmer. The BMS programmer may assign certain rights and privileges to the new computer thus dictating what it can read and what it can control by register writes. A typical configuration is shown in FIG. 4A and FIG. 4B.

The following blocks are contained in FIG. 4A:

Control Outputs to Boiler [401]; Status inputs from boiler [403]; BMS Out-station controlling heating [405]; Control outputs to AHU [407]; Status inputs from AHU [409]; BMS Out-station controlling fresh air supply [411]; Physical temperature sensor [413]; 0-10 v input connected to $1^{st}$ floor ceiling temperature sensor [415]; $1^{st}$ floor space temperature Register 8002 (read/only) [417]; Modbus Register Read Control [419]; Out-station control strategy logic and Modbus interface manager [421]; Modbus Register Map [423]; Chiller Enable Register 8018 (write/only) [425]; Digital signal 0-5v where 5v represents Chiller Enable [427]; Physical chiller or AC plant [429]; Physical chiller pump speed control [431]; 0-10 v output to the variable frequency chiller pump control [433]; Chilling pump speed control Register 8020 (write/only) [435]; Modbus Register Write Control [437]; Modbus over IP network [439].

The following blocks are contained in FIG. 4B:

Control Outputs to Boiler [451]; Status inputs from boiler [453]; BMS Out-station controlling heating [455]; Control outputs to AHU [457]; Status inputs from AHU [459]; BMS Out-station controlling fresh air supply [461]; Control outputs to cooling system [463]; Status inputs from physical cooling system and space temperature sensors [465]; BMS Out-station controlling cooling [467]; BMS Connection Live StatusMonitor [469]; Modbus interface manager [471]; BMS Interface manager [473]; NTL, MSCR and NNCPS calculation algorithms [475]; Schedule Files [477]; Temperature set-point files [479]; Database [481]; Internet or some IP public network [483]; Weather forecast generator [485]; Server Database [487]; Status Reporting Web Service [489]; Cooling system optimizer [491]; Cloud-based replica of on-site system algorithms [493].

Control Strategy and Protocol

The control strategy is agreed with the BMS programmer and the register mapping is shared between the BMS and a computer system performing according to the inventive method. This allows the inventive method, implemented upon a computing device, to control reading and writing to certain registers. For example, consider a case where a computing device performing the inventive method reads all internal space temperatures and plant schedules, BMS external temperature and Total Global Radiation data. With this data, the computing device performing according to the inventive method calculates the natural thermal lag for the building over a one day period. With these space temperature data and the Total Global Radiation, the computing device calculates the Solar Gain Rate (SGR). With knowledge of the start and stop times for the heating system, the computing device also calculates the Day-time Natural Cool-down Rate (DNCR) which according to the SGR and DNCR algorithms explained in this specification, results in the computing device performing according to the inventive method writing to the heating plant OFF/ON registers to disable or to re-enable the heating plant.

In this way, the inventive method controls the day-time heating of the building by enabling or disabling the building's heating system during the occupied hours. These OFF periods are specifically identified to not adversely affect occupant comfort levels by maintaining a very tight range of space temperatures.

Several interlocks are implemented in various embodiments of the invention as between the computing device and the BMS. These ensure that the BMS knows the computing device is functional. If, for any reason, the computing device fails to respond to the regular 'are you alive' request from the BMS, the BMS will revert to the stored control strategy and its default operational schedules. In this way, in the event of the computing device or communications failure, no down time should be experienced by the BMS or the building.

Proof of Concept: Test Building Implementation of this Method

The method involving the various lags and profiles was implemented in a building in Western Europe. This building has been referred to as the test building or B1. Building B1 is a single-tenant premium office building located at a city-center business park. Arranged as six floors over basement carpark, it comprises almost 11,000 m² of usable office space (approximately 120,000 sqft) and is concrete constructed with columns and cast in-situ flooring slabs. The building is considered a heavy building unlike a more conventional steel-framed building and with that weight comes a larger thermal mass—slow to heat up and slow to cool down. All lag and profile calculations were performed manually in preparation for their implementation in an automated computerized system.

Commencing with the establishment of an energy usage benchmark or baseline, the various lags and profiles were observed during the first month without any energy efficiency interventions. During this time, several open-office spaces were monitored and the internal and external temperatures were recorded. This data provided guidance for the initial assessment of how the lags might be successfully applied to the operation of the building plant. Note that the lags and lag profiles have been developed as (1) high level indicators of building envelope thermal performance and (2) indicators of how the building envelope interacts with the installed plant. In the B1 building, they have been used to guide reduced plant operations specifically to generate better energy efficiency in the use of plant to provide agreed levels of occupant comfort.

The following sections outline the baseline establishment, the specific actions taken as a result of the lag calculations and finally, the results of this implementation are described.

P1 Energy Baseline

Before the energy reduction program commenced, an energy usage baseline was agreed with the B1 building operator. After the operator had carefully considered the previous and following year's energy usage data and the weather experienced during these years, the figures from a typical full calendar year were selected as the most indicative of reasonable annual energy use. FIG. 5 shows the various agreed baseline energy loads in B1 over the course of this year.

Please note that all units used in the implementation of the method for the B1 building and reported here are S.I. or metric units as that what is now customarily used in Europe by building and design personnel. Where possible, the equivalent units from the US Customary system have also been included.

Identifying Energy Reduction Opportunities

Prior to the commencement of the efficiency program, the B1 building was operated on a full 24/7 basis with all plant enabled to run most of the time. The BMS schedules, together with the control strategies and the daily space temperatures available on the BMS, were analysed in detail to determine the best opportunities for energy reduction. The following section outlines the conclusions reached from this analysis.

In order to determine the building's actual operational hours, it was suggested to security staff that an informal log might be kept of approximate staff numbers using the building late at night and over the weekends. These observations, over a two month period, showed that the building was lightly used overnight and at weekends, varying between 10 and 25 people at any time at weekends.

B1 Overheating

Prior to the commencement of the efficiency program, the amount of thermal energy being driven into the building from the B1 boilers far exceeded the tabulated average values from the CIBSE design and operation guidelines. According to CIBSE Guide A, thermal energy input to an office building should be in the vicinity of 210 kWh/m²/yr for typical usage and 114 kWh/m²/yr for good practice usage. B1 was consuming 347 kWh/m²/yr during the course of the baseline year, based on a usable office space figure of 9,350 m² (approximately 100,000 square feet).

Likewise, electricity usage numbers were 350 kWh/m²/yr, while the CIBSE usage guideline for typical office buildings was 358 kWhr/m²/yr and 234 kWh/m²/yr for good practice office buildings. The energy usage figures from CIBSE for typical office, good practice office and actual baseline year are shown in FIG. 9.

B1 Over-Chilling

Once the overheating issue was identified, the amount of chilling going into B1 also came under scrutiny. It was suspected that the over-heating of the building had a direct effect on the amount of chilling demanded by the individual fan coil units (FCU) on all floors. The BMS schedules for heating and chilling were examined and found to be running close to 24 hours per day.

It was reasonable to assume that the chiller schedule, starting at 2 am, was set up to avoid overheating during the early morning hours. If overheating could be reduced, the amount of chilling required might also be reduced.

B1 Oversupply of Fresh Air

The air handling units (AHU) were scheduled to run on a 24/7 basis. Given the B1 boilers were similarly scheduled, this meant the building was being supplied with tempered air at all times. Again an energy reduction opportunity presented itself based on the recommended fresh air flow in CIBSE Guide A at between 6 and 15 l/s/person (liters/sec/person), depending on the design parameters. This is almost identical to recommendations in ASHRAE Standard 55 for buildings in the USA. The four AHUs in B1, operating at full power, can deliver 28,000 l/s into the building. Significant losses in airflow are inevitable in the long non-linear ducts between AHU and office vents, but from the ventilation design, the fresh air supply is well in excess than that required for the current 500 occupants. The designers would have sized the AHUs for a maximum number of occupants, particularly in meeting rooms and open areas, such as the restaurant. With a reduced staff count at weekends, a reduced airflow is also possible. With the AHUs installed in B1, there was no mechanism to reduce the fan speeds—they are either on or off.

Monitoring of $CO_2$ levels in open plan offices areas showed that while the building is fully occupied, the level of fresh air is very high as indicated by the $CO_2$ readings (650 after 30 min of no fresh air). The recorded air quality suggested that while the AHUs could be turned off periodically during occupied hours for maybe up to one hour, a better solution would be to simply reduce the very high airflow emanating from the AHUs. With this in mind, it was recommended that the installation of variable frequency drives be considered. This recommendation was accepted soon after.

Changing B1 BMS from Demand Driven to Schedule Driven Operation

When first analysed, the BMS was found to have been programmed as a demand-driven system. The underlying assumption is that heating and cooling were available from the main plant at all times and one relies on the correct functionality of the local FCUs to use the heat and cooling resources as required.

One of the potential drawbacks of demand driven systems can manifest itself if FCUs are left permanently on or are malfunctioning. There is a possibility that a heating and/or cooling load could always exist, whether the space is in use or not. In any case, the fact that the boiler or chiller is enabled overnight will create a load just to keep these systems available in standby.

It was recognised early in the efficiency program, that substantially better control could be achieved if the BMS was changed from demand driven to time schedule driven. This would allow observation and confirmation of occupant comfort temperature compliance given various small and incremental changes to the delivered environment. In changing to a time schedule control strategy, a much finer level of control would be available and it would be possible to lower the amount of the heat delivered to B1 in a controlled manner. It was hoped the amount of chilling required by B1 could also decrease with the smaller amount of delivered heat. The calculation of the various lags and profiles were facilitated by this change from a demand to a schedule driven BMS strategy. The changes to plant operations suggested by these lags and profiles could also be more easily implemented with a schedule driven system.

Summary of B1 SGR and DNCR statistical models

Following data collection from existing sources such as the BMS, newly installed monitoring equipment and observation, the Solar Gain Rate and Day-time Natural Cool-down Rate models were derived from this data. Data mainly comprised local external temperature and global radiation (sunshine), internal space temperatures and $CO_2$ levels (various) and energy usage by plant type (boiler). These data proved sufficient to complete the profile model calculations as indicated in FIG. 10.

Implementation of Energy Reduction Programme

The practical application of the material contained in this specification to the B1 building forms part of an overall energy efficiency program. Many measures were implemented simultaneously or following each other over a comparatively short timescale. This was done as it would prove commercially impossible to separate out all of the individual measures and accurately report on the reduction effects of each one. For this reason, the figures showing the energy usage reduction in the following sections are for the complete program, rather than just the implementation of the material contained in this specification. However, the use of the solar gain rate and daytime natural cool-down rate both contributed to the dramatic changes in energy efficiency in the heating of the B1 building.

Figure 7:
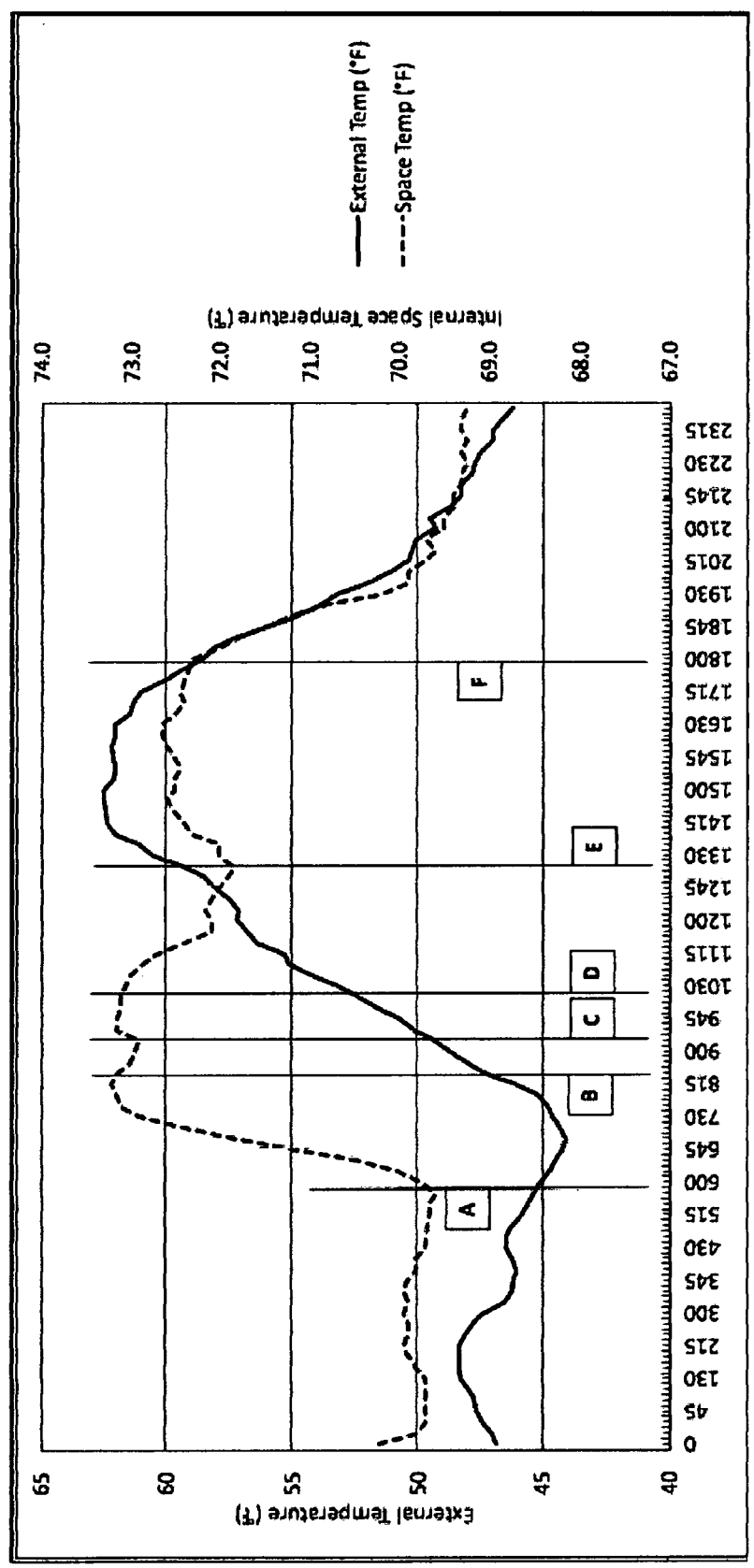
Figure 8:
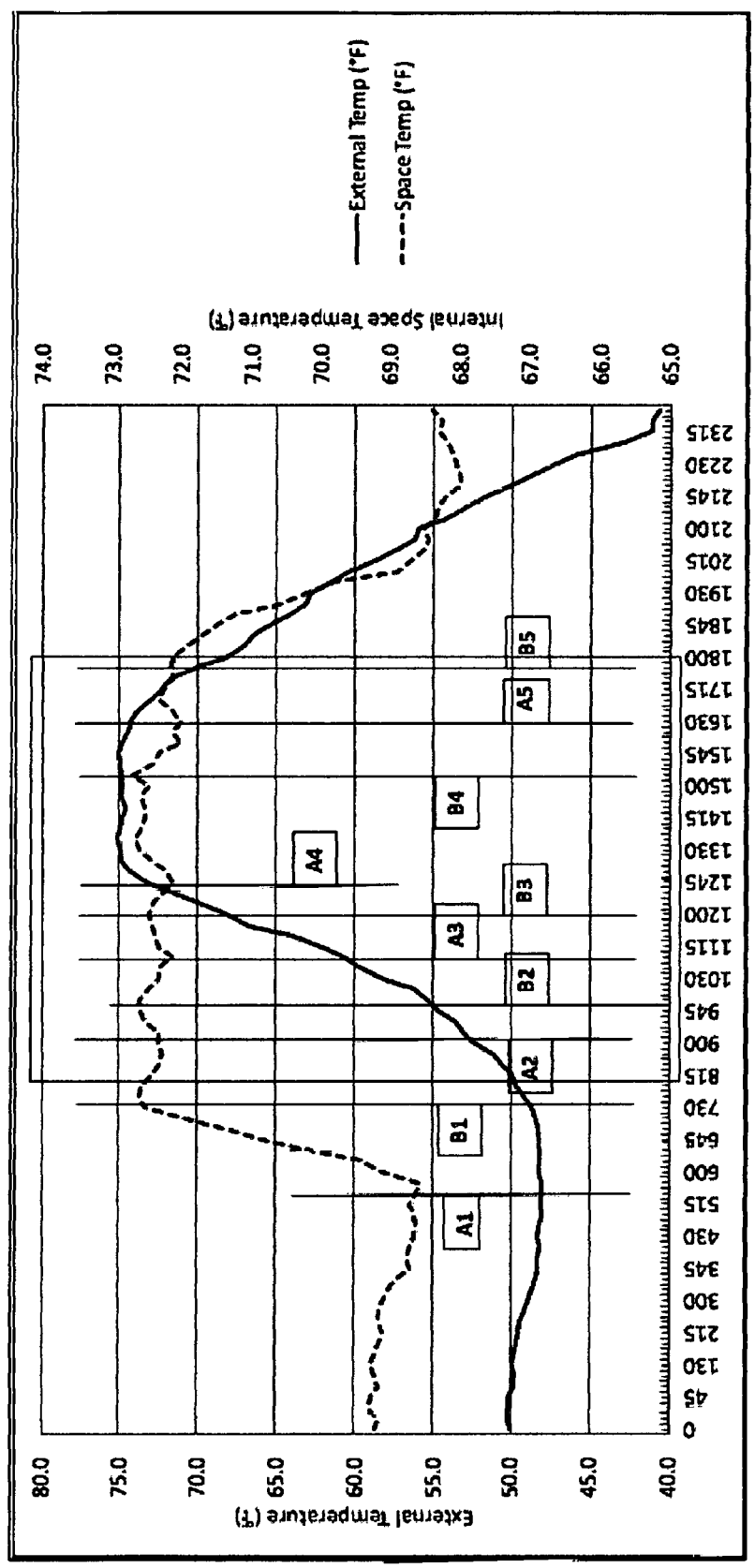

The energy reduction program has primarily focussed on the large plant and equipment. The first interventions concern the heating, chiller and ventilation schedules. For building B1, FIG. 6 shows the internal space temperature profile while mechanical heating is enabled, normal occupancy, high solar activity and the use of chilling to compensate for the oversupply of heat. This was how the building responded prior to the efficiency program. FIG. 7 shows the internal space temperature profile with mechanical heating enabled, normal occupancy, low solar activity and use of heating control to regulate space temperature. The changes in the heating control strategy have made it possible to eliminate the need for chilling on a day of low solar activity. Finally, FIG. 8 shows the use of improved heating controls to more effectively keep the internal space temperature between 72 F and 73 F even on a day of high solar activity. This has been achieved by use of the SGR and DNCR profiles to calculate when best to temporarily turn off heating to lower space temperature, while balancing the heat gains from the solar activity.

Figure 11:
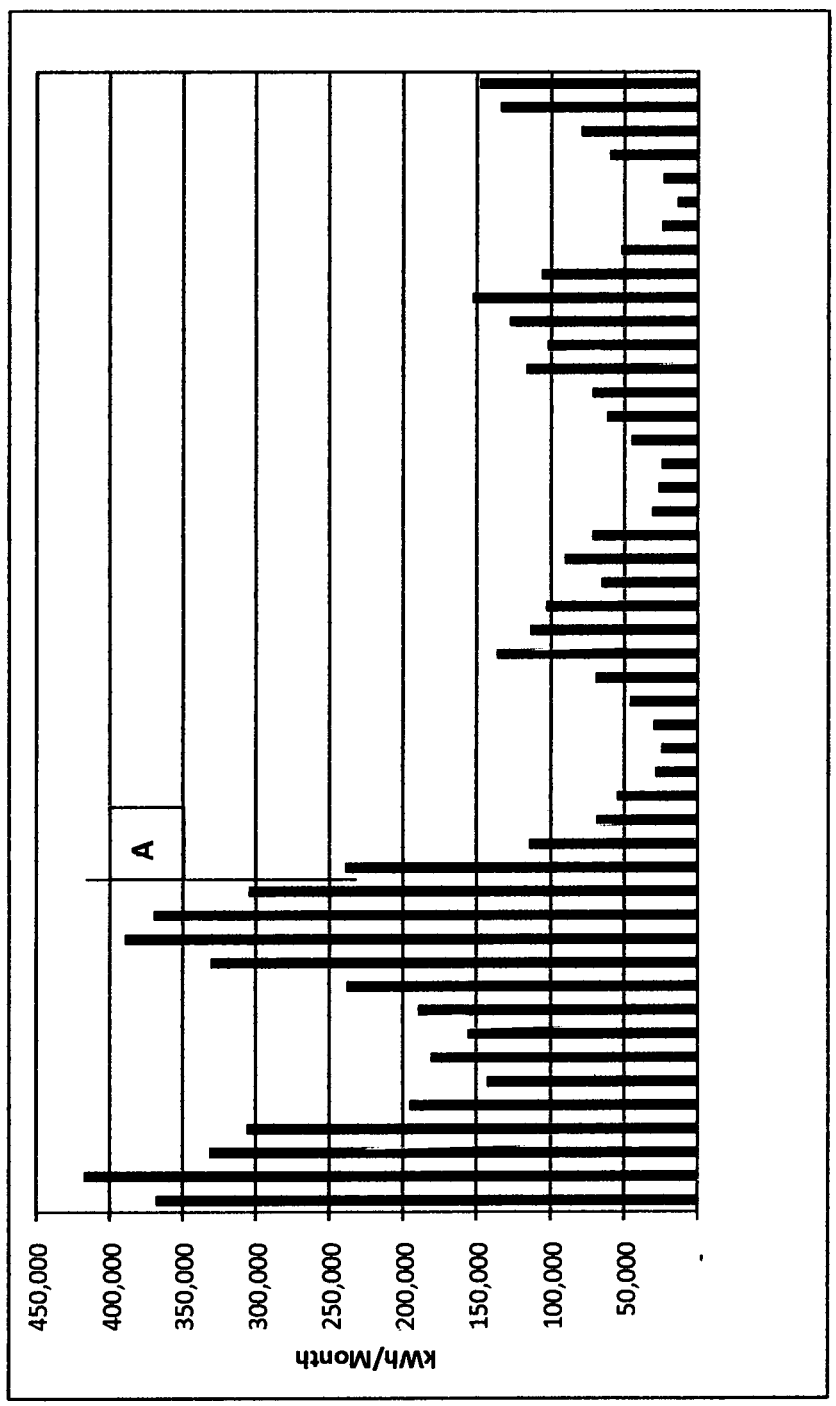
Figure 12:
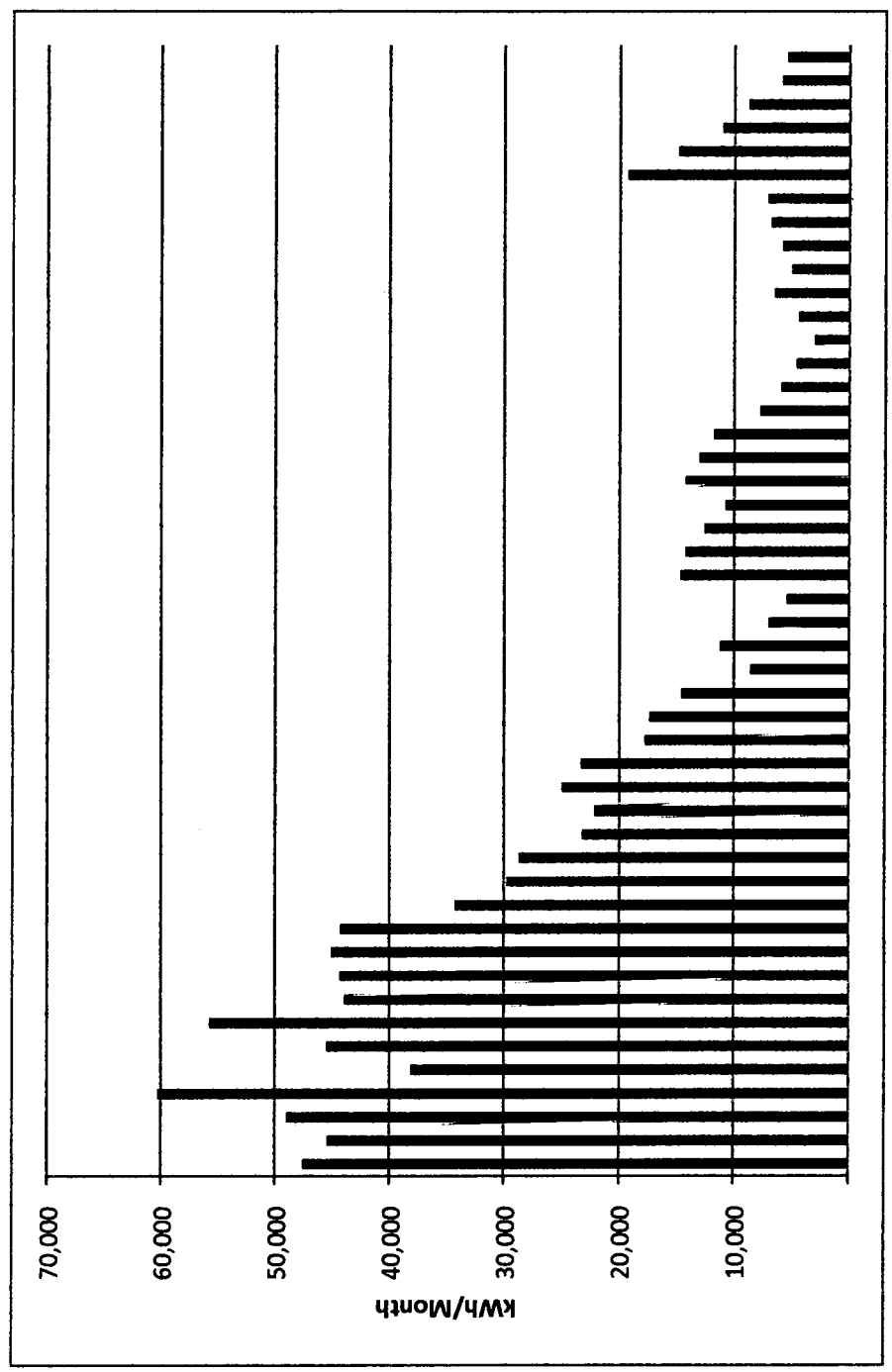

It is evident from the monthly usage in FIG. 11 that heating was dramatically reduced soon after interventions commenced. This reduction in heating has positively affected the cooling load of the building as evidenced from FIG. 12, which shows the cooling delivered to building B 1. The combined heat and cooling loads are shown over the three years following the efficiency program compared to the CIBSE Guide A Good Practice usage numbers in FIG. 13.

FIG. 14 shows the monthly comparison usage figures for total electricity usage comparing the benchmark year with a year at the end of the efficiency program.

Results of the Energy Reduction Program

A number of important changes in BMS schedules and set-points resulted in reductions in energy use in B1 which will be enumerated in this section. The analysis of heating and chilling patterns guided by the mechanical heat and cooling lags and the equivalent natural cooling lags, were also instrumental in identifying the inefficiencies which caused B1 to be over-supplied with both heat and chilling.

CONCLUSION

The savings achieved in building B1 represent an overall saving of 54% based on a direct comparison of total energy consumption figures over a three year period from before and after the energy efficiency program. It is clear that building B1, as with many other buildings that have been examined, substantial overheating was the norm. This in turn, caused substantial over-cooling to compensate. Both heating and cooling are expensive services in any western country and they should be limited to what is required for the building to provide a good working environment to occupants. When considering the quality of the thermal environment of any commercial building, there is nothing to be gained from overheating or overcooling.

Building plant has been sized to cater for the worst weather conditions and the maximum number of occupants. Whether these maximum conditions are ever met, is unclear, but equipment such as chillers, air handling units and boilers are very large consumers of power and gas and as such, they need to be controllable, with their operational times adjusted regularly to ensure no overheating or under-heating is occurring.

The method described in this document, along with the lags described in publication number 2013-0304269 A1 and publication number 2015-0198961 A1 were applied to this building. The inventive method provided substantial improvement and reduction of energy usage, while preserving the delivery occupant comfort, and in certain respects, such as air quality, improving it.

The invention claimed is:

1. A method of controlling a commercial building heating system, said method accounting for daily solar activity, external temperature, and solar gain rate and day-time cool-down rate of a building of interest, said method comprising the steps of:
   a) determining, for said building, a natural thermal lag;
   b) selecting, for said building, at least one space to observe and record temperature;
   c) determining, for said building of interest, an internal set-point for a heating season;

d) recording data, for said building and said selected space until said space temperature stops rising, said data including:
   i. actual total global radiation for period while said space temperature rises
   ii. temperature of said space in b) at sunrise
   iii. time required for temperature of said space to rise by 1 degree Fahrenheit
   iv. external temperature data at preselected intervals;
e) deriving, using said recorded data of step d), a regression model of change in said space temperature as a function of total global radiation for a heating-season day by $$\sum_{t_{sunrise}}^{t_{maxTsp}} TGR_t = \beta_0 + \beta_1 T_{sp_t} \pm \epsilon_i$$

wherein $$\sum_{t_{sunrise}}^{t_{maxTsp}} TGR_t$$

is an accumulating value of total global radiation as recorded and accumulated over preselected intervals, commencing at sunrise ($t_{sunrise}$) and ceasing at ($t_{maxT_{sp}}$) peak temperature of said preselected space, and)
   $\beta_0$ is a y-axis intercept of accumulating total global radiation and said preselected space temperature, and
   $\beta_1$ is a slope of accumulating total global radiation and said preselected space temperature and represents Solar Gain Rate for said heating day, and
   $T_{sp_t}$ is a value of said preselected space temperature at time t, and
   $\epsilon$ is variability;
f) determining said solar gain rate of said building, and obtaining
a series of $SGR_{i=1...N}$ values for a plurality of heating days 1 . . . N, wherein said solar gain rate is linked to average daily external temperature by $$SGR_i = \beta_0 - \beta_1 T_{Out_i} \pm \epsilon_i$$

wherein
   $SGR_i$ is a slope of the relationship in e) derived for heating days 1 . . . N, and
   $\beta_0$ is a y-axis intercept of said solar gain rate and the averaged external temperature from sunrise to a time said preselected space attains a peak value, and
   $\beta_1$ is a slope of accumulating solar gain rate and an average external temperature, and
   $T_{Out_i}$ is an averaged external temperature from sunrise to a time a said preselected space attains said peak value on day i, and
   $\epsilon$ is variability;
g) recording, for said building,
   i. heating system shut-down time,
   ii. preselected space temperature at heating system shut-down time i,
   iii. time required for preselected space temperature to fall by 1 degree Fahrenheit,
   iv. external temperature data at preselected intervals;
h) deriving, using g) recorded data, a model of the preselected space temperature change as a function of the difference between said preselected space temperature and a lagged external temperature by $$T_{SPi} = \beta_0 + \beta_1(T_{SPi} - \text{LaggedTout}_i) \pm \epsilon_i$$

wherein
   $T_{SPi}$ is a temperature of preselected space at time i, and
   $\beta_0$ is a y-axis intercept of preselected space temperatures and differences from external lagged temperatures, and
   $\beta_1$ is a slope of internal space temperature $T_{SPi}$ and differences between $T_{SPi}$ and external lagged temperature $\text{LaggedTout}_i$ at time i and represents a day-time cool-down rate, DNCR, for said heating day, and
   $\text{LaggedTout}_i$ is a value of lagged external temperature at time period i, and
   $\epsilon$ is variability;
i) determining a day-time cool-down rate $DNCR_{i=1...N}$ values for a plurality of heating days 1 . . . N by $$DNCR_i = \beta_0 - \beta_1 A\text{LaggedTout}_i \pm \epsilon_i$$

wherein
   $DNCR_i$ is a derived day-time cool-down rate on day i, on which the heating system is operating, and
   $\beta_0$ is a y-axis intercept between day-time cool-down rate and daily average lagged external temperature, and
   $\beta_1$ is a slope between DNCR and a daily lagged average external temperature $A\text{LaggedTout}_i$, where
   $A\text{LaggedTout}_i$ is a value of daily average lagged external temperature calculated for day i, and
   $\epsilon$ is variability;
j) predicting one hour sections of solar gain rate and day-time cool down rate, and, through vector combination, predicting change in the temperature of said preselected space after building heating system shut down;
k) obtaining weather forecast of said external temperature;
l) estimating time for said preselected space temperature to drop by 1 degree Fahrenheit;
m) calculating for said building an OFF time and ON time for said building heating system; and
n) controlling a building heating system responsive to receiving instructions in accordance with said calculated Off and ON times.

* * * * *